United States Patent
Fukakusa et al.

(10) Patent No.: US 6,256,283 B1
(45) Date of Patent: Jul. 3, 2001

(54) OPTICAL PICKUP HAVING A COMMON LIGHT BEAM PATH FOR PASSING EITHER OF A PLURALITY OF KINDS OF LIGHT BEAMS

(75) Inventors: Masaharu Fukakusa, Kamamoto-ken; Taiichi Mori, Fukuoka-ken; Hiroshi Tanigawa; Haruhiko Kono, both of Kumamoto-ken; Mikio Tomisaki, Chikushino; Seigi Ito, Yamaga; Kazuyuki Nakashima, Fukuoka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/939,088

(22) Filed: Sep. 26, 1997

(30) Foreign Application Priority Data

| Oct. 19, 1996 | (JP) | 8-260391 |
| Oct. 23, 1996 | (JP) | 8-280481 |
| Jan. 27, 1997 | (JP) | 9-012169 |
| Feb. 17, 1997 | (JP) | 9-031621 |
| Feb. 21, 1997 | (JP) | 9-037584 |
| Mar. 6, 1997 | (JP) | 9-051330 |
| Apr. 1, 1997 | (JP) | 9-082592 |
| Apr. 2, 1997 | (JP) | 9-083623 |
| Apr. 4, 1997 | (JP) | 9-086377 |
| Apr. 4, 1997 | (JP) | 9-086379 |
| Jun. 24, 1997 | (JP) | 9-166955 |

(51) Int. Cl.[7] .................................................. G11B 7/00
(52) U.S. Cl. .................. 369/112; 369/44.12; 369/44.37; 369/94
(58) Field of Search .............................. 369/44–37, 112, 369/117, 12.1, 103, 44.29, 44.12, 110, 44.11, 44.23, 54, 94; 257/98, 99

(56) References Cited

U.S. PATENT DOCUMENTS

| 4,399,529 | * | 8/1983 | Leterme et al. | 369/110 |
| 5,191,204 | | 3/1993 | Dickson et al. . | |
| 5,295,125 | * | 3/1994 | Oonishi et al. | 369/44.29 |
| 5,296,724 | * | 3/1994 | Ogata et al. | 257/98 |
| 5,493,554 | * | 2/1996 | Sasaki et al. | 369/110 |
| 5,615,200 | * | 3/1997 | Hoshino et al. | 369/112 |
| 5,648,951 | * | 7/1997 | Kato et al. | 369/112 |
| 5,703,856 | | 12/1997 | Hayashi et al. | 369/112 |
| 5,808,986 | * | 9/1998 | Jewell et al. | 369/44.37 |

FOREIGN PATENT DOCUMENTS

| 855363 | 2/1996 | (JP) . |
| 9534117 | 12/1995 | (KR) . |

\* cited by examiner

Primary Examiner—John W. Careca
Assistant Examiner—Kim-Kwok Chu
(74) Attorney, Agent, or Firm—Stevens, Davis, Miller & Mosher, LLP

(57) ABSTRACT

An optical pickup device has a single light beam path for common use in treating or passing either of a plurality of kinds of light beams for respective recording densities and/or recording-medium-thicknesses different from each other, in other words, at least one or either of the plurality of kinds of light beams is introduced into the common single light beam path which may includes a single quarter-wave plate and/or single collimator and/or single objective.

40 Claims, 14 Drawing Sheets

OPTICAL PICKUP HAVING A COMMON LIGHT BEAM PATH FOR PASSING EITHER OF A PLURALITY OF KINDS OF LIGHT BEAMS

BACKGROUND OF THE INVENTION AND RELATED ART STATEMENT

The present invention relates to an optical pickup for recording information onto an optical recording medium and/or reading out the information from the optical recording medium.

In the prior art, when information need to be recorded onto a plurality of optical recording mediums different in recording density and/or medium-thickness from each other and/or to be read out from the different optical recording mediums, a plurality of optical system each of which includes a light beam source, a collimator, a light beam splitter, a quarter-wave plate, and an objective for respective recording density and/or medium-thickness are used.

SUMMARY OF THE INVENTION

An object of the present invention is to provide an optical pickup device with a minimized size and a simplified structure.

According to the present invention, the optical pickup device comprises a single light beam path toward an optical recording medium (the single light beam path may include, for example, a single quarter-wave plate and/or a single collimator and/or a single objective) to be used for treating or passing optically a plurality of kinds of light beams (different from each other in, for example, wavelength) for respective recording densities and/or recording-medium-thicknesses, that is, the optical pickup device according to the present invention has the single light beam path for common use in treating or passing either of the plurality of kinds of light beams for respective recording densities and/or recording-medium-thicknesses different from each other, in other words, at least one or either of the plurality of kinds of light beams is introduced into the common single light beam path which may includes the single quarter-wave plate and/or single collimator and/or single objective.

Since the quarter-wave plate and/or the collimator and/or the objective is used in both of the optical treatings or passings of the plurality of different kinds of light beams for respective recording densities and/or recording-medium-thicknesses different from each other, that is, a number of the quarter-wave plate and/or the collimator and/or the objective necessary for the optical treatings of the plurality of different kinds of light beams is minimized, a size of the optical pickup device for the recording densities and/or recording-medium-thicknesses different from each other is minimized.

Further, since the single light beam path is used in both of the optical passings of the plurality of different kinds of light beams for respective recording densities and/or recording-medium-thicknesses different from each other, a structure of the optical pickup device is simplified, and the size of the optical pickup device for the recording densities and/or recording-medium-thicknesses different from each other is minimized.

DESCRIPTION OF THE PREFERRED EMBODIMENTS

[First Embodiment]

First, a first embodiment of the present invention will be described below with reference to the accompanying drawings.

Figure 1:
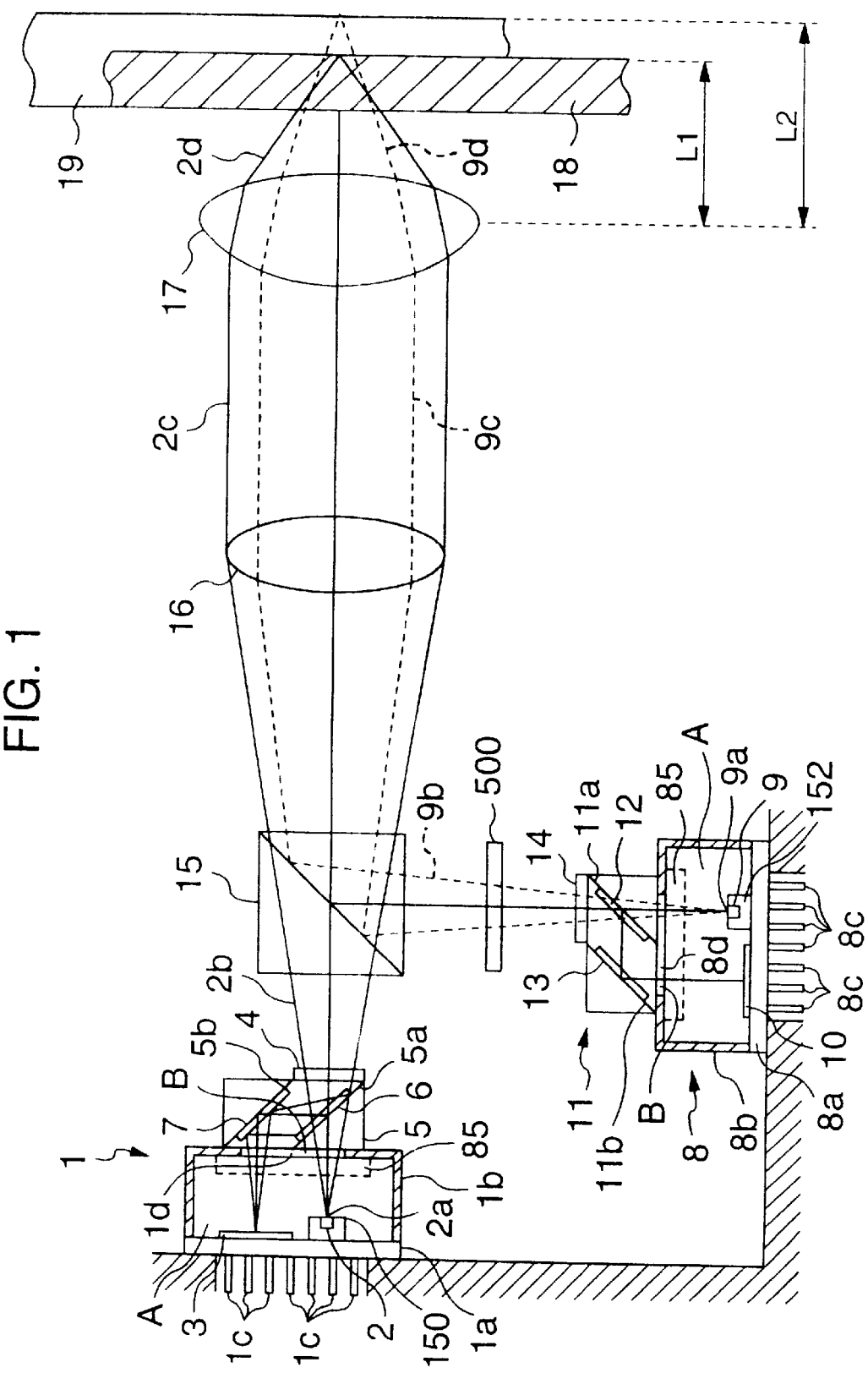
FIG. 1 is a cross section illustrating a configuration of packaging of an optical pickup and an optical path of a first embodiment according to the present invention.

Referring to FIG. 1, there is shown a cross section of a configuration of an optical pickup and an optical path of the first embodiment according to the present invention. In FIG. 1, a dotted line represents an optical path for reproducing a low-density optical disk and a solid line represents an optical path for reproduce a high-density optical disk.

In FIG. 1, a first package 1 comprises a light source 2 for emitting light for a high-density optical disk 18, a substrate portion 1a on which a light receiving means 3 or the like are mounted to receive light reflected by the high-density optical disk 18, and a sidewall portion 1b arranged so as to enclose these members. The substrate portion 1a and the sidewall portion 1b and others can be formed either integrally or separately. If they are integrally formed, an assembly process can be simplified so as to increase the productivity. As materials of the first package 1, there are metal, resin, are ceramic. Particularly, it is preferable to use the metal or ceramic in these since the heat generated in the light source 2 can be favorably discharged.

Further in the metal materials, it is preferable to use metal materials such as Cu, Al, or Fe alloy materials such as FeNi alloy or FeNiCo alloy having high thermal conductivity. It is because these materials are low-cost and have high heat dissipation effects, in addition to having an effect of a magnetic shield which cuts off noises such as electromagnetic waves from a high-frequency superposition circuit or the like. In these materials, particularly Fe, FeNi alloy, and FeNiCo alloy have lower thermal resistance and favorable heat dissipation, so that they can dissipate efficiently to the outside the heat which is generated in the light source 2. Additionally, these materials are low-cost, and therefore it becomes possible to provide an optical pickup device at a low price.

Furthermore, the first package 1 discharges a heat generated by the light source 2 to the outside by making the substrate portion 1a and, if necessary, the sidewall portion 1b in contact with a carriage having a great thermal capacity. Accordingly, as an area of the substrate portion 1a in contact with the carriage becomes larger, the package 1 obtains more favorable heat dissipation effects.

Still further, in the substrate portion 1a, there are provided terminals 1c for supplying power to the light source 2 and for transmitting electric signals from the light receiving means 3 to an arithmetic circuit. These terminals 1c can be either pin-typed or printed-typed. In this embodiment, particularly pin-typed terminals 1c will be described below.

The terminals 1c are inserted into a plurality of holes n the substrate portion 1a without being electrically connected to the substrate portion 1a made of metal material. For the materials of the terminals 1c, it is preferable to use FeNiCo, FeNi, FeCr or other alloy.

As means of interrupting the electrical connection between the substrate portion 1a and the terminals 1c, preferably an insulating coating is put on portions between respective terminals 1c and substrate portion 1a in the holes, and further preferably the coating is closed so that the air will not penetrate from the portions. As materials satisfying these requirements, it is preferable to use materials which are both insulating and impermeable such as hermetic seal. Particularly, it is preferable to use hermetic seal of matched-sealing type or compressed-sealing type. It is because these materials can be prepared very easily for both of the insulating and hermetic effects in addition to being extremely low-cost, and therefore it is possible to simplify a process of mounting the terminals 1c on the substrate portion 1a and further to reduce a manufacturing cost of the optical pickup.

In addition, these types of hermetic seal can remain high hermetic and insulating effects in a wide rage of temperature, and therefore reliability of the optical pickup can be improved and a shape of the terminals can be deformed relatively at will, whereby a degree of freedom of the design can be increased.

As the light source 2, it is preferable to use a light source which has favorable coherence, directivity, and condensing effects with a single color, since a beam spot having an appropriate shape can be formed relatively easily so as to restrain an occurrence of noises. It is preferable to use various laser lights such as a solid, gas, or semiconductor laser light as those satisfying these requirements. Particularly, the semiconductor laser is very small in size and effective to make the optical pickup smaller easily, whereby it is optimum as the light source 2.

In addition, preferably the light source 2 of the semiconductor laser has preferably 800 nm or lower of the oscillation wavelength, since it is possible to make easily a beam spot to which the light from the light source converges on a record medium so as to have almost a size of a pitch of a track formed on the record medium. Furthermore, if the oscillation wavelength of the light source 2 is 650 nm or lower, it is possible to form a beam spot which is so small that a record medium on which extremely high-density information is recorded can be reproduced, whereby a mass storage means can be easily achieved and particularly it is preferably used as the light source 2 provided for reproduction of records on a high-density optical disk.

If the light source 2 comprises a semiconductor laser, as materials which satisfy the requirement of the oscillation wavelength of approx. 800 nm or lower, there are AlGaInP, AlGaAs, ZnSe, and GaN; particularly AlGaAs is preferable in these chemical compound materials since it has easy crystal growth characteristics, and therefore it is effective to manufacture a semiconductor laser easily, which leads to high yield and high productivity. As materials which satisfy the requirement of the oscillation wavelength of 650 nm or lower, there are AlGaInP, ZnSe, and GaN. By using a semiconductor laser made of these materials as the light source 2, a diameter of the beam spot formed on the record medium can be reduced further, which makes possible to further improve the recording density, and therefore it becomes possible to reproduce a high-density optical disk.

In these materials, particularly AlGaAsP is preferable since it has a stable performance for a long period and therefore it makes it possible to improve reliability of the light source 2.

In addition, preferably an output of the light source 2 is in a range of approx. 2 to 10 (mW) if it is dedicated to reproduction, since it makes it possible to assure an enough quantity of light required for reproduction and to limit an energy consumption to the minimum, and further to restrain the amount of heat which is discharged from the light source 2. If the light source is used for both of recording and reproduction, a great amount of energy is required to change a status of a record layer at recording, and therefore at least 25 (mW) or greater output is needed. If the output exceeds 50 mW, it becomes hard to dissipate the heat discharged from the light source 2 to the outside and therefore the light source 2 and its peripheral portion have high temperature, whereby a life of the light source 2 is significantly reduced and, in the worst case, the light source 2 may be destroyed. Accordingly, an electric circuit may cause malfunction, the light source 2 itself may cause a fluctuation of the wavelength which leads to a shift of the oscillation wavelength, or noises may be included in signals, by which the reliability of the optical pickup is significantly reduced, and therefore an output exceeding the level is not preferable.

Next, an explanation will be made for a light source mounting portion 150 on which the light source 2 is mounted.

The light source mounting portion 150 has a rectangular parallelepiped or plate shape with the light source 2 mounted on its top or side surface. The light source mounting potion 150, which is put on the substrate portion 1a or the sidewall portion 1b, dissipates the heat generated by the light source 2 in addition to holding the light source 2.

For a joint between the light source mounting potion 150 and the light source 2, taking into consideration a heat conductivity, it is preferable to use a method in which the top of the light source mounting portion 150 is plated with a solder material such as Au-Sn before it is soldered at high temperature or a method in which Au-Sn, Sn-Ag, Sn-Sb, or Sn-Pb-In foil (several $\mu$m to tens of $\mu$m in thickness) is contact-bonded at high temperature.

Unless the light source 2 is mounted almost in parallel with the mounting surface of the light source mounting portion 150, it may cause an aberration of an optical system or a reduction of a bonding efficiency. Therefore, preferably the light source 2 is mounted on the light source mounting portion 150 at a predetermined position, at a predetermined height, and almost in parallel with the mounting surface when it is bonded.

Furthermore, a plane of electrodes is placed on the top of the light source mounting portion 150 so that it is electrically connected to the bottom of the light source 2. The plane of electrodes is provided for supplying power to the light source 2, and preferably a thin film of Au is used as a metal film composing the plane of electrodes from a viewpoint of conductivity and resistance properties.

The light source mounting portion 150 is preferably made of material having high heat conductivity and a linear expansion coefficient close to that of the light source 2 (approx. $6.5 \times 10^{-6}/°C$.) from a viewpoint of the heat generated by the light source 2 or mounting on the light source 2. Specifically, it is preferable to use materials having a linear expansion coefficient of 3 to $10 \times 10^{-6}/°C$. and heat conductivity of 100 W/mK or greater, for example, AlN, SiC, T-cBN, Cu/W, Cu/Mo, or Si, and for example, diamond particularly when the light source 2 of a high output is used and the heat conductivity must be extremely high.

If the light source 2 and the light source mounting portion 150 have the same or close values as the linear expansion coefficients, it is possible to prevent an occurrence of distortion between the light source 2 and the light source mounting portion 150, which makes it possible to prevent disadvantages that the mounted portion between the light source 2 and the light source mounting portion 150 gets out of place or that a crack is made on the light source 2.

If they are out of the above range, however, a large distortion may occur between the light source 2 and the light source mounting portion 150, which increases a possibility of causing problems that the mounted portion gets out of place between the light source 2 and the light source mounting portion 150 or that a crack is made on the light source 2.

In addition, with the heat conductivity of the light source mounting portion 150 set to as highest as possible, the heat generated by the light source 2 can be efficiently dissipated to the outside.

If the heat conductivity is lower than the level described above, however, it becomes hard to dissipate the heat generated by the light source 2 to the outside, and therefore the temperature of the light source 2 is increased and the wavelength of the light emitted from the light source 2 is shifted. As a result, a convergence position of the light on the record medium changes minutely, whereby a lot of noise elements are included in reproduced signals or whereby an output of the light source 2 is decreased and a record reproducing operation on the record medium cannot be normally performed, further the life of the light source 2 is reduced, or in the worst case, the light source 2 may be destroyed or other disadvantages can easily occur.

In this embodiment, is used AlN having very excellent characteristics in these two aspects.

Furthermore, it is preferable to form thin films of Ti, Pt, and Au in this order from the light source mounting portion 150 to the light source 2 on the top of the light source mounting potion 150 so that the light source mounting portion has favorable bonding effects with the light source 2. If Si is used as a material of the light source mounting portion 150, it is preferable to form an insulating layer such as $Al_2O_3$ film or a surface oxidation film on the member surface before the Ti layer is formed.

Figure 2:
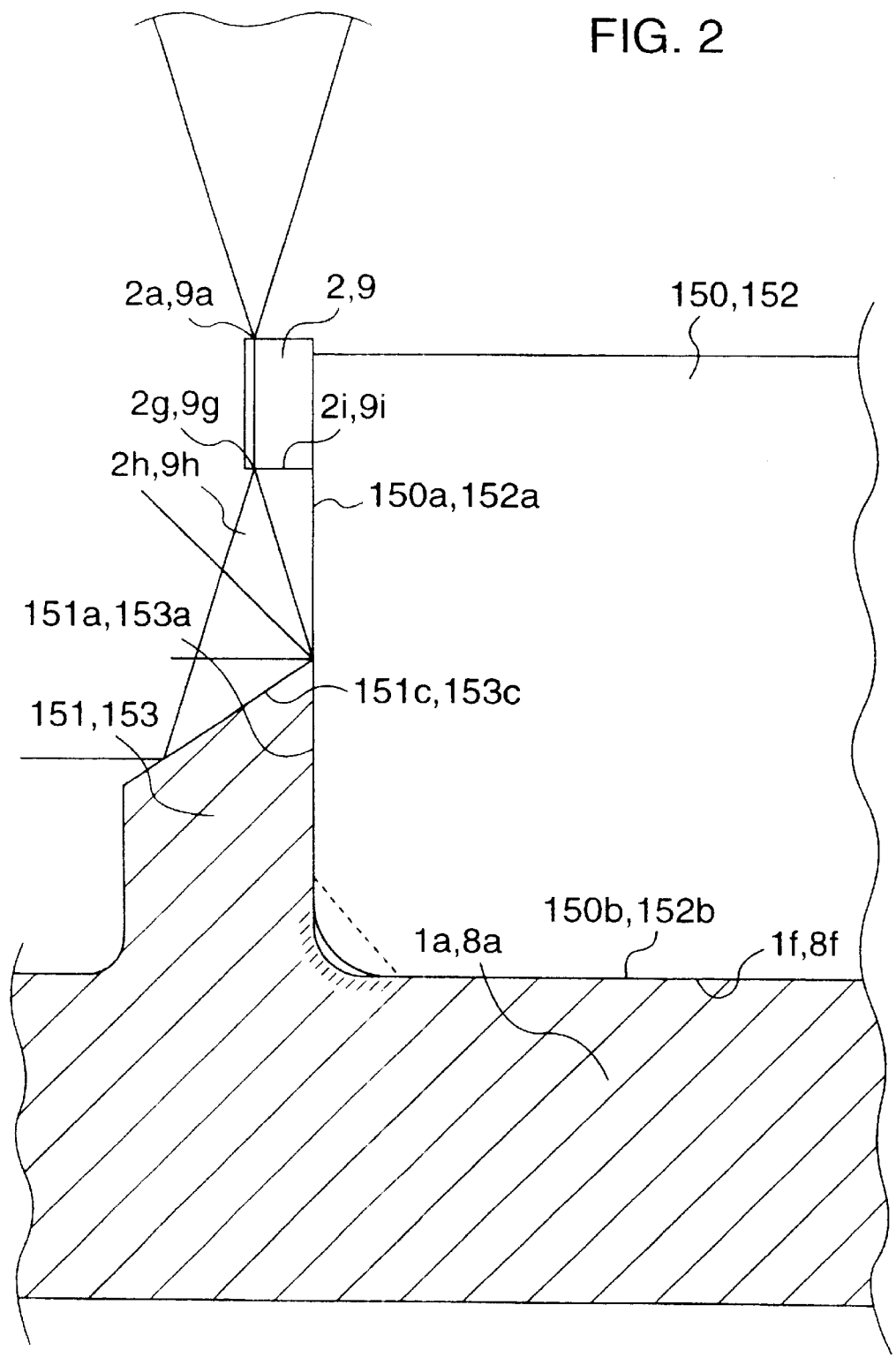
FIG. 2 is a cross section of a peripheral portion of light sources of the first embodiment according to the present invention.

Next, an arrangement of the light source mounting portion 150 on the substrate potion 1a will be described below. Referring to FIG. 2, there is shown a cross section of a peripheral portion of the light source in the first embodiment according to the present invention.

On the substrate portion 1a, a raised portion 151 having an almost rectangular parallelepiped shape is formed. By making a side portion 151a of the raised portion 151 in contact with a side portion 150a of the light source mounting portion 150, positioning of the light source mounting portion 150 can be performed. In other words, the light source mounting potion 150 is previously placed on a surface 1f of the substrate 1a, and the light source mounting potion 150 is bonded to the side portion 151a of the raised portion 151 which is precisely chamfered by means of a bonding material while being pressed on it.

With this configuration, the light source mounting portion 150 on which the light source 2 is mounted can be placed in a predetermined position more easily and precisely, whereby it becomes possible to achieve a high-performance optical pickup whose optical characteristics are less degraded by a deviation of the position of the light source 2.

Although the positioning of the light source mounting portion is performed by using the raised portion in this embodiment, the same effect can be obtained by arranging a recess portion on the substrate portion.

As for the bonding material used for bonding between the light source mounting portion 150 and the substrate portion 1a, it is preferable to use a metallic bonding material such as solder or an optical hardening resin which is hardened by an ultraviolet light or a visible light since they have a bonding power exceeding a level of the required value. Particularly when using a metallic bonding material, it is preferable to take measures for obtaining favorable bonding effects such as previous plating with metal for the surface 1f of the substrate portion 1a, the side 151a of the raised portion 151, and the bottom 150b or the side 150a of the light source mounting portion 150.

In addition, preferably an angular portion, which is formed by the bottom 150b of the light source mounting portion 150 and the side 150a which is in contact with the raised portion 151, has a predetermined radius (R) or has a corner whose sharp edge is removed.

Figure 3:
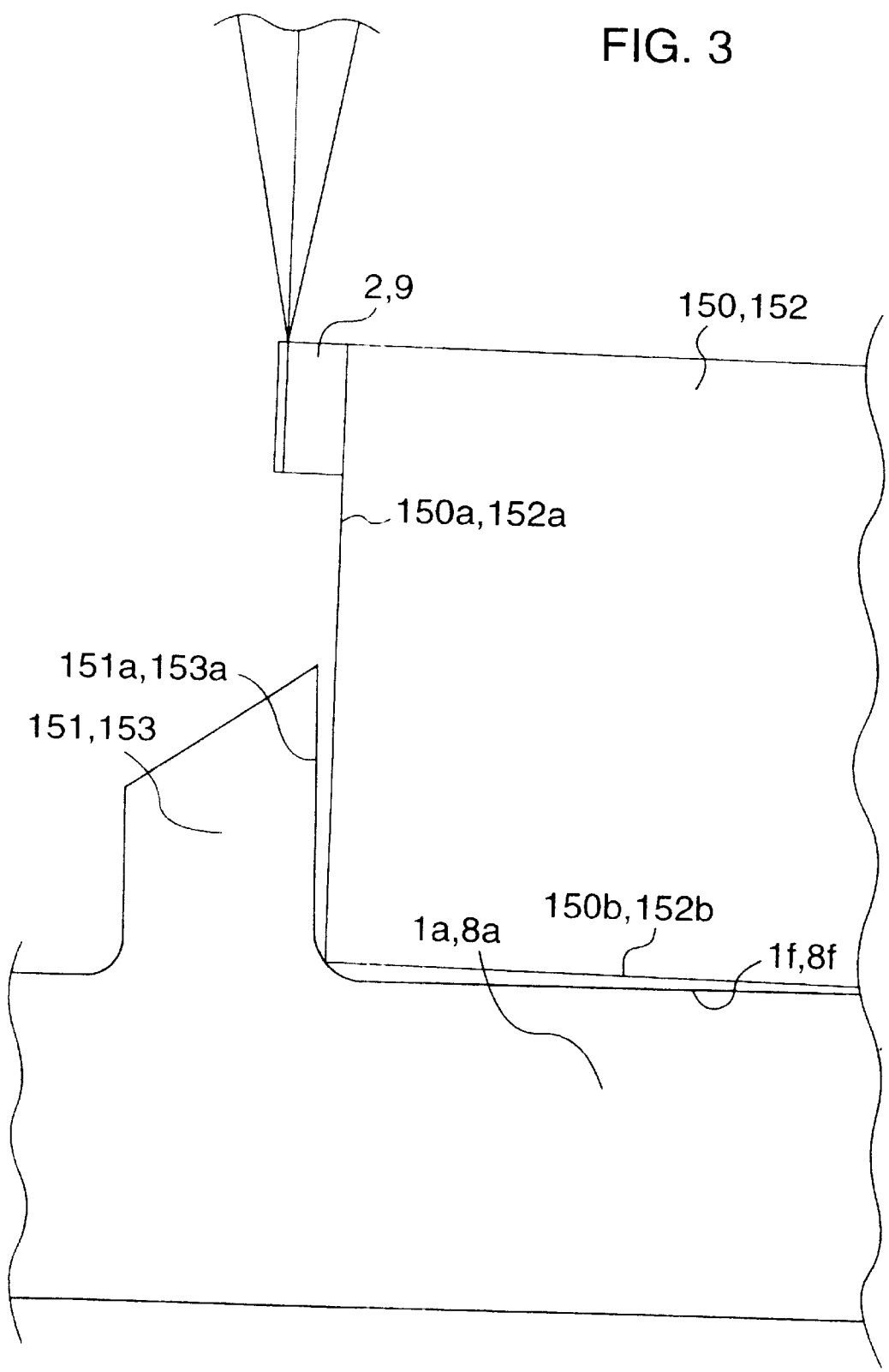
FIG. 3 is a cross section of a peripheral portion of light sources of an embodiment which is not according to the present invention.

It will be described by using a drawing. Referring to FIG. 3, there is shown an enlarged view of a peripheral portion of the light source in an embodiment which is not according to the present invention. As shown in FIG. 3, in general, frequently the surface 1f of the substrate 1a does not cross at right angles precisely to the side 151a of the raised portion 151. In this case, when the light source mounting portion 150 is pressed on the raised portion 151, the light source mounting portion 150 is inclined as shown in the drawing, which causes a deviation from a predetermined position of an optical axis of the light emitted from the light source 2 mounted on the light source mounting portion 150, whereby a predetermined track of the record medium is not irradiated with the light. Therefore, precise recording nor reproduction cannot be performed.

Accordingly, in this embodiment, as shown in FIG. 2, there is provided a configuration in which the angular portion, which faces the raised portion 151 of the light source mounting portion 150 and the substrate portion 1a, is rounded (represented by a solid line in the drawing) or its sharp edge of the corner is removed (represented by a dotted line in the drawing), so that the corner is not brought into contact with the non-rectangular portion formed by the surface 1f of the substrate portion 1a and the side 150a of the raised portion 151 or is adapted to fit the non-rectangular portion.

With this configuration, even if the surface of the substrate portion 1a does not cross at right angles to the side 151a of the raised portion 151, the light source mounting portion 150 can be bonded with the substrate portion 1a in an accurate position, and therefore it becomes possible to achieve an optical pickup having favorable record reproduction characteristics without no deviation from a predetermined position of the optical axis of the light emitted from the light source 2 mounted on the light source mounting portion 150.

Furthermore, preferably the light source 2 mounted on the light source mounting portion 150 is formed so as to face the raised portion 151, in other words, the raised portion 151 is formed in an extending direction of a backward emitting light 2h from the light source 2. The explanation will be made below for this description.

Since the raised portion 151 is used for precise positioning of the light source mounting portion 150 as set forth in above, it can be intrinsically in contact with any surfaces only if it is in contact with the light source mounting portion 150. It is necessary, however, to take preventive measures so as to inhibit the backward emitting light 2h from the light source 2 from being incident upon the light receiving means or optical members as stray light. In this embodiment, these measures are taken on the raised portion 151.

In this embodiment, the top 151c of the raised portion 151 is inclined to an end surface 2i on which a luminous point 2g of the light source 2 exists. On the top 151c, a metallic or dielectric film having a high reflectance is formed over the surface or partially so as to reflect the backward emitting light 2h from the luminous point 2g upon the top 151c non-perpendicularly. Preferably the angle of inclination on the top 151c of the raised portion 151 to the end surface 2i is set according to an angle of diffusion of the light emitted from the light source 2.

With this configuration, the backward emitting light 2h from the light source 2 can be favorably reflected in predetermined directions and preferably it is possible to prevent the backward emitting light 2h from being incident as a stray light on the optical members or light receiving means with being reflected or diffused inside the package 1.

Although the top 151c of the raised portion 151 is formed so as to have a high reflectance, a high extinction modulus can be applied instead of the high reflectance. As a configuration for increasing the extinction modulus, there is a method of arranging an extinction film over the surface of the top 151c or on a part of it. As for the extinction film, a translucent glass or resin material, an Si or Ti film, or an Si film and a Ti film is often used in a predetermined thickness.

Furthermore, preferably the film thickness of the extinction film is changed according to the wavelength of the incident light. In this manner, also when the light sources having various wavelengths, the extinction film can securely absorb the light from the respective light sources.

In the configuration in which the extinction film is used, most of the energy of the absorbed light is converted to a heat, and therefore it is preferable to use a material having a favorable heat dissipation and a high heat conductivity as a material of the reflection member on which the extinction film is formed. By using these materials, it becomes possible to prevent an occurrence of disadvantages that a given extinction effect cannot be obtained due to a change of an organization of the extinction film caused by an increase of the temperature of the reflection member.

With this configuration, the light from the luminous point 2g of the light source 2 is absorbed on the top 151c without being reflected almost at all, and therefore the light from the luminous point 2g hardly impinges on the optical members as a stray light, whereby it becomes possible to achieve an optical pickup having favorable signal characteristics.

Although the top 151c of the raised portion 151 is inclined to the end surface 2i of the light source 2 in the example of the light reflection type, it need not be inclined in this case.

In addition, the light source mounting portion 150 need not be placed if the light source 2 is formed on the same semiconductor substrate as for the light receiving elements 3 or if the light source is directly placed on the substrate.

In the opening 1d of the first package 1, there is a first optical member 5 which is bonded. The first optical member 5 serves as a guide of the light emitted from the light source 2 and reflected on the record medium to a predetermined position of the light receiving means 3. In this embodiment, an explanation will be made for a configuration in which the first optical member 5 has a plurality of inclined planes and a returning light is induced by using the optical elements formed on respective inclined planes.

The first optical member 5 contains a first inclined plane 5a and a second inclined plane 5b inside. Further, there are provided an optical path dividing means 6 comprising a half mirror and a polarizing separation (polarization beam splitter) film on the first inclined plane 5a and a reflection means 7 for guiding the incident light to the light receiving means 3 on the second inclined plane 5b. If data can be rewritten into a high-density optical disk, the optical disk must be irradiated with extremely-high energy, and therefore the light emitted from the light source 2 must be guided to the optical disk as efficiently as possible. From this viewpoint, it is preferable to use the optical path dividing means 6 made of a polarizing separation (polarization beam splitter), being combined with a quarter-wave(length) plate 4, since it improves an efficiency of utilizing the light and makes it possible to use a plurality of types of optical disks for recording or reproduction. In addition, preferably it makes it possible to restrain the amount of light emitted from the light source 2, whereby the life of the light source 2 can be elongated and therefore reliability of the optical disk unit can be improved.

The quarter-wavelength plate 4 serves as a converter of the light incident with linear polarization to an elliptic polarization, and if the rotary direction of an elliptic polarization is reversed due to a reflection on the record medium, the elliptic polarization is converted to a linear polarization which crosses at right angles to the direction of the incident polarization described above.

In a position of the reflection means 7, it is preferable to arrange an optical element which satisfies an object (for example, to form a focus error signal with non-point aberration (astigmatism)). For example, if a focus error signal is formed in a knife edge method, there is provided an optical element which is capable of forming a knife edge in the position of the reflection means 7, and if a focus error signal is obtained by using a non-point aberration (astigmatism) method, there is provided an optical element which is capable of forming a non-point aberration (astigmatism) in the position of the reflection means 7. Taking into consideration that these optical elements are formed in the first optical member 5, it is preferable to apply a configuration in which the optical elements are made of hologram since it makes the optical member thinner than that with optical elements made of lens, whereby the space can be used more efficiently so as to make the first optical member 5 smaller and thinner easily.

In addition, preferably the first optical member 5 is formed in a shape of a parallel planar plate as a whole since it is effective to prevent an occurrence of aberration, whereby favorable reproduction signals or focus tracking signals can be formed. Furthermore, preferably the first optical member 5 is mounted so that its top and bottom are precisely perpendicular to the optical axis of the transmitted light since it is effective to prevent an occurrence of the non-point aberration (astigmatism) and a degradation of reproduction signals caused by an unfocused spot.

As for materials of the first optical member 5, it is preferable to use materials having a high light transmission such as glass or resin since it is effective to prevent a decrease of the quantity of light and a degradation of the optical characteristics of the light transmitted through the first optical member 5. Particularly, glass is preferable as a material of the first optical member 5 since it does not cause a birefringence and therefore the characteristics of the transmitted light can be favorably maintained. Furthermore, it is more preferable to use optical glass having a low wavelength dispersion, in other words, a high Abbe's number such as a BK-7 since it is effective to prevent an occurrence of an aberration of a spherical surface caused by a fluctuation of a wavelength.

As for a method of forming the first optical member 5, it is preferable to use a method in which a plurality of die-shaped prisms containing optical elements are linearly bonded or a method in which optical elements are formed in predetermined positions of plate components and then respective plate components are laminated to be cut out into a given shape since these methods are useful to obtain favorable productivity. Particularly the latter method is preferable since it makes it possible to obtain both of high productivity and high yield.

Although the first optical member 5 is directly bonded to the sidewall 1b of the first package 1 so as to close the opening 1d arranged on the sidewall 1b in this embodiment, the first package 1 can be spaced apart from the first optical member 5. By placing them separated each other, it becomes possible to adjust more precisely a distance between the light source 2 and the first optical member 5 which becomes a problem if the height of the package 1 is uneven, by which the optical characteristics of the light guided to the light receiving means 3 by the first optical member 5 can be favorably maintained, so that signals can be detected accurately.

Next, referring to Rig. 1, a second package 8 comprises a substrate portion 8a on which a light source 9 emitting light for a low-density optical disk and a light receiving means 10 are mounted and a sidewall portion 8b arranged so as to enclose these members. The following describes about the second package 8 focusing on different points from the first package 1.

First, as materials of the second package 8, it is preferable to use metal or ceramic in the same manner as for the first package 1 since they are effective to discharge favorably the heat generated by the light source 9.

The heat conductivity of the material of the second package 8 is preferably equivalent to or smaller than that of the material of the first package 1. It is because the light source 2 for the high-density optical disk 18 often has an output which is the same as or greater than that of the light source 9 for the low-density optical disk 19, and therefore the amount of heat discharged from the light source 2 is the same as or greater than that of the light source 9. It is because, if this package is configured so that the portions for holding the light sources and for discharging heat have the same amount of heat conductivity if the amount of heat dissipation of the light source 2 is not identical with that of the light source 9, a temperature of the light source 2 becomes higher than that of the light source 9, which causes an unbalance in the operating conditions between the light sources 2 and 9, and therefore in some cases the life of the light source 2 is greatly different from that of the light source 9, whereby there is a possibility of causing disadvantages such as decreasing reliability of the optical pickup significantly.

With the heat conductivity of the material of the second package 8 being equivalent to or smaller than the heat conductivity of the material of the first package 1, it becomes possible to reduce the possibility that the temperature of the light source 2 becomes higher than that of the light source 9, and therefore differences of the operating conditions between the light source 2 and the light source 9 can be reduced, so that it is possible to prevent the above described disadvantages from being caused.

Preferably the first package 1 has a contact area different from an area where it is in contact with a carriage of the second package 8. With these different contact areas being provided, it becomes possible to discharge more heat per unit time due to the larger areas, and therefore a difference between the amounts of the generated heat can be favorably resolved though the difference cannot be absorbed by a difference of the heat conductivity between respective packages. In this embodiment, particularly there is provided a large area where the first package 1 is in contact with the carriage.

Preferably the oscillation wavelength of the light source 9 is 800 nm or lower since a beam spot which is formed by the light emitted from the light source and converging on the record medium can be easily adjusted to the similar size of the pitch of the track which is formed on the record medium. Particularly the light source 9 is allowed to have an oscillation wavelength longer than that of the light source 2. For example, when a CD is reproduced, a beam spot in an enough size can be formed on the low-density optical disk with about 780 nm.

Next, an explanation will be made for a light source mounting portion 152 on which the light source 9 is to be mounted.

The light source mounting potion 152 is almost the same as the light source mounting portion 150 in its shape, mounting position, and functions, and therefore the explanation is omitted here. The amount of heat generated by the light source 9, however, is not so great in comparison with that of the light source 2 in a lot of cases, and therefore requirements of the characteristic values are not so severe as those of the light source mounting portion 150. Therefore, the light source mounting portion 152 is preferably made of a material having a linear expansion coefficient close to that of the light source 9 (approx. $6.5 \times 10^{-6}/°$ C.) and a heat conductivity which is ⅕ or greater than that of the light source mounting portion 150, taking into consideration an output ratio of the light source 2 to the light source 9. Specifically, it is preferable to use a material having a linear expansion coefficient of 3 to $10 \times 10^{-6}/°$ C. and a heat conductivity of 20 W/mK or greater. For example, as these materials, there are Mo, Cu, Fe, FeNiCo alloy, or FeNi alloy in addition to the materials described as the examples for the light source mounting portion 150. In this embodiment, the light source mounting portion 152 is made of the materials such as Cu, Mo, or the like which is extremely low-cost in comparison with AlN which is the material of the light source mounting portion 150 and has relatively superior characteristics in the above aspects.

An area in which the light source mounting portion 152 is in contact with the substrate portion 8a or the sidewall portion 8b is preferably smaller than the area in which the light source mounting portion 150 is in contact with the substrate or sidewall portion. With this configuration, it becomes possible to conduct the heat generated by the light source 2 having a heat emitting amount generally greater than that of the light source 9 to the substrate favorably in particular. Accordingly, also when using a semiconductor laser having a low resistance to high temperatures, it is possible to prevent the temperature in use of the light source 2 from being increased to a level which is greatly higher than that of the light source 9, whereby the life of the light source 2 is not clearly shorter than that of the light source 9 as a result, and therefore the life of the optical pickup can be relatively elongated and its reliability can be improved.

Furthermore, the light source mounting portion 152 is smaller than the light source mounting portion 150 in the first package 1, and it will be described below.

In a lot of cases, there is a difference between the required heat dissipation levels of the light source mounting potion 150 on which the light source 2 is mounted and the light source mounting potion 152 on which the light source 9 is mounted. To cope with this difference, it is an effective method to apply different shapes to them.

In other words, the light source mounting potion 150 is formed in a larger size in comparison with the size of the light source mounting portion 152 to increase the heat capacity of the light source mounting portion 150, so that the heat generated by the light source 2 is efficiently conducted to the light source mounting portion 150.

With this configuration, the heat generated by the light source 2 can be discharged through conduction to the light source mounting portion 150, and further heat dissipation caused by radiation from the surface of the light source mounting portion 150 can be utilized at a greater ratio in addition to the heat dissipation from the light source mounting portion 150 through conduction to the substrate portion 1a or the sidewall portion 1b, whereby the heat from the light source 2 having a large amount of heat emission can be discharged very efficiently.

Further, in this case, the amount of conducted heat of the light source mounting portion 150 is preferably greater than that of the light source mounting potion 152. With this configuration, it becomes possible to discharge the heat from the light source 2 having a greater output to an outside more efficiently via the light source mounting portion 150.

Accordingly, it restrains a shift of a wavelength of the light emitted from the light source 2 which is caused by an increase of a temperature of the light source 2 since the heat is accumulated around the light source 2. Furthermore, the increase of the temperature of the light source 2 can be efficiently restrained, and therefore it is possible to prevent the light source 2 from being degraded by the heat or from being destroyed, which improves the reliability of the optical pickup.

Although the light source mounting portions are discriminated by applying different shapes to them in this embodiment, it is preferable to make a difference between them in their volumes since it affects the amounts of the accumulated heat most effectively.

In addition, with the surface area of the light source mounting portion 150 being greater than the surface area of the light source mounting potion 152, an amount of radiation heat from the surface of the light source mounting portion 150 can be increased. With an amount of radiation heat per unit time from the light source mounting portion 150 being greater than an amount of radiation heat per unit time from the light source mounting portion 152, heat can be discharged to the outside efficiently from the light source mounting portion 150 through radiation, too, whereby a thermal load of the light source 2 can be reduced.

Although two light source packages are used in this embodiment, any number of light source packages can be used only if two or more packages are used. At this point, preferably the physical properties of each light source mounting portion depends on an output of the light source mounted on the light source package.

As set forth hereinabove, with the physical properties (for example, a heat capacity, a size, a volume, a surface area, etc.) of the light source mounting portion 150 on which the light source 2 is mounted being different from the physical properties of the light source mounting portion 152 on which the light source 9 is mounted, it becomes possible to discharge efficiently the heat from the light source 2 whose output is high and which is likely to have a high temperature, and therefore it is possible to prevent a shift of the oscillation wavelength caused by an increase of the temperature of the light source 2 or to prevent the light source 2 from being destroyed due to the heat.

In addition, the temperature of the light source 2 under the operation can be almost the same as that of the light source 9, in other words, the operation is not performed with only one of them having a extremely high temperature, and therefore there is not so much difference between the lives of the light sources 2 and 9, whereby the optical pickup can secure higher reliability without much variation of the life of the optical pickup.

Although the second optical member 11 has the almost same configuration as for the first optical member 5, in some cases, there is a difference of the optical elements formed on respective inclined planes between them, and it will be described below. On a fist inclined plane 11a, there is provided an optical path dividing means 12 made of a half mirror and a polarizing separation (polarization beam splitter) film, and on a second inclined plane 11b, there is provided a reflection means 13 for guiding an incident light to a light receiving means 10.

At this point, a signal detection method is different between a high-density optical disk and a low-density optical disk in a lot of cases. Therefore, an arrangement of a light receiving section in the light receiving means 10 is often different from that of the light receiving section of the light receiving means 3. Accordingly, if focus error signals are formed by the reflection means 13 when a light from the optical disk is guided to the light receiving means 10, the reflection means 13 has preferably a shape different from that of the reflection means so as to form optimum signals for respective optical disks, whereby more precise signal forming and operation control can be achieved and it becomes possible to obtain a more reliable optical pickup having less malfunctions.

An arrangement of the light source mounting portion 152 in the substrate portion 8a is almost the same as that of the light source mounting potion 150 in the substrate portion 1a as shown in FIG. 2, and further in the same manner the light source 9 mounted on the light source mounting portion 152 is arranged so as to face a raised portion 153. Accordingly, an explanation of the arrangement is omitted here.

The oscillation wavelengths of the light sources 2 and 9 in this embodiment, however, are different from each other since they are used to cope with different record mediums; 630 to 660 nm for the light source 2 and 770 to 800 nm for the light source 9. Therefore, different points caused by it will be described below.

Generally in the metallic or dielectric materials used for reflecting light, a ratio of a reflected light to an incident light (a reflectance) or a ratio of an absorbed light to an incident light (an extinction modulus) often depends on a wavelength of the incident light, in other words, there is a dependence of the reflectance on the wavelength in a lot of cases. Accordingly, if the lights from the light sources 2 and 9 are reflected on a reflection member having the same configuration, there is a difference of the reflection ratio between the lights from the light source 2 and the light source 9, which leads to a possibility of causing disadvantages such as an increase of scattering due to the difference.

Therefore in this embodiment, it is preferable to use materials of a reflection film or an extinction film on a top 153c of the raised portion different from those of the top 151c. In other words, a reflection film (an extinction film) is formed on the top 151c with a material having a great reflectance (an extinction modulus) to a wavelength of the light emitted from the light source 2, and a reflection film (an extinction film) is formed on the top 153c with a material having a great reflectance (an extinction modulus) to a wavelength of the light emitted from the light source 9.

With this configuration, preferably the both backward emitting lights from the light sources 2 and 9 can be reflected favorably in given directions (can be favorably absorbed), and therefore the lights are reflected and scattered inside respective packages so as to prevent the lights from being incident on the optical members and light receiving means as stray lights.

In this embodiment, the light sources 2 and 9 are different in size each other. An explanation will be made for this point below.

In many cases, an optical output of the light source 2 is different from that of the light source 9. It is mainly because their record mediums for recording or reproduction are not identical and therefore the required quantities of lights are often different from each other. Accordingly, the light source 2 has a heat emitting amount different from that of the light source 9, and therefore there is a difference between their temperatures during the operation.

There are the following disadvantages which may be caused when there is a difference between the temperatures of the light sources during the operation:

A shift of an oscillation wavelength caused by a change of a temperature and a degradation of optical characteristics accompanying it A degradation or destruction of the light sources caused by a high temperature, i.e., a reduction of the lives of the light sources These disadvantages are not preferable since they reduces the life of the product and lowers its reliability.

In this embodiment, so as to prevent an occurrence of these disadvantages, the light source 2 has a size, specifically, an area in which the light source 2 is in contact with another member, which is different from that of the light source 9. Since the heat generated by the light sources is discharged to respective members in contact with the light sources through conduction, for example, if an output of the light source 2 is greater than that of the light source 9, a contact area of the light source 2 larger than that of the light source 9 makes it possible to discharge more heat per unit time from the light source 2 through conduction. It is effective to prevent the light source 2 from having a temperature during operation greatly different from the temperature of the light source 9 during operation, and therefore it prevents an occurrence of the above disadvantages, which leads to elongate the life of the product and to improve its reliability so as to be preferable.

In addition, it is also effective to apply different surface areas to the light sources 2 and 9. Generally as a form of a heat transmission, there is a radiation (emission) in addition to the conduction described above. Since the amount of radiation heat per unit time or unit area depends on a temperature, a larger surface area generates a greater amount of radiation heat at the same temperature.

Accordingly, if the output of the light source 2 is greater than that of the light source 9, a surface area of the light source 2 larger than that of the light source 9 generates a greater amount of radiation heat from the light source 2 in comparison with the amount of radiation heat from the light source 9, so as to reduce the difference of the temperature between the light source 2 and the light source 9 during operation. Accordingly, this configuration is preferable since it is effective to prevent an occurrence of the above disadvantages, to elongate the life of the product, and further to improve its reliability.

As set forth hereinabove, with the light sources different in size from each other according to respective outputs of the light sources in an optical pickup including a plurality of light sources, different amounts of heat can be radiated from respective light sources, and therefore it becomes possible to minimize a difference of the temperature between the light sources during operation, which leads to prevent disadvantages such as a shift of oscillation wavelengths caused by a temperature change of the light sources, a degradation of the optical characteristics accompanying it, and a degradation or destruction of the light sources caused by a high temperature, in other words, a reduction of lives of light sources. Therefore, it is effective to elongate the life of the product in which this type of an optical pickup is installed and to improve the reliability of the product.

Next, it is preferable to enclose the inside space surrounded by the first package 1, in other words, the space in which the light source 2 and the light receiving elements 3 are arranged. With this configuration, it becomes possible to prevent dust or moisture from being included into the inside of the package, whereby the performances of the light source 2 and the light receiving elements 3 can be maintained and it also prevents a degradation of the optical characteristics of the emitted light.

In this embodiment, the first package 1 is closed by the first optical member 5. In other words, the bottom of the first optical member 5 is bonded with an outer surface of the sidewall section 1b of the first package 1 so as to close the opening 1d provided for the first package 1. The bonding material used here are mostly, for example, optical hardening resin, epoxy resin, or bonding resign.

It is more preferable to previously enclose $N_2$ gas or inactive gas such as a dry air or Ar gas in the closed space since it prevents a deterioration of optical characteristics caused by sweating on the bottom of the first optical member 5 which faces the inside of the first package 1 and a degradation of the characteristics caused by oxidation of the light source 2 or the light receiving elements 3.

With this configuration in which the first optical member 5 is bonded to the sidewall portion 1b of the first package 1 by using bonding material so as to close the first package 1, a cover glass can be omitted here though it is conventionally needed only for closing this portion, and therefore a configuration of the optical pickup can be simplified so as to reduce the number of the components. In addition, manufacturing process groups of the optical pickup can be reduced to only a single process group of positioning and bonding optical members though conventionally the manufacturing requires two process groups, the positioning and bonding optical members and bonding cover member for closing the package, and therefore the manufacturing processes of the optical pickup can be simplified so as to improve productivity of the optical pickup.

Additionally, since the first optical member 5 is exposed to the outside of the first package 1, the package can be smaller in comparison with a configuration in which the first optical member is contained in the package, whereby the size of the optical pickup can be also reduced so as to increase an efficiency of utilizing the space of the optical pickup.

Furthermore, With a configuration in which optical elements are not arranged on the surface which is exposed to the outside but placed between prisms in the first optical member 5, it is possible to prevent an occurrence of disadvantages, for example, that given performances cannot be maintained since the optical elements are exposed to the surrounding air and absorbs moisture or that the characteristics are degraded due to dust on the optical elements.

[[At this point, an inside pressure of the first package 1 is preferably negative. It is effective to make the bonding effects favorable between the first optical member 5 and the first package 1 since a pressure is applied in such a direction that the first optical member 5 bonded to the sidewall portion 1b of the first package 1 is drawn from the outside of the first package 1 to the inside thereof.

Next, there is described below an embodiment having further preferable configuration.

In a configuration of this embodiment, the first package 1 is not closed only by the first optical member 5 from the outside, but the opening 1d of the first package 1 is closed by a shield member 85 (indicated by a dotted line in the drawing) and the first optical member 5. In other words, the shield member 85 is arranged so as to close the opening 1d on the sidewall portion 1b of the first package 1 from the inside of the first package, and the first optical member 5 is arranged so as to close the opening 1d on the sidewall portion 1b of the first package from the outside thereof, and therefore the inside of the first package 1 is enclosed by these two members.

Now the advantages of this configuration will be described below. If the inside pressure of the first package 1 is positive, the shield member 85 bonded from the inside is pressed to the sidewall portion 1b including the bonding material, which is effective to decrease a possibility of an occurrence of a leak. If it is negative, however, the pressure is applied in such a direction that the shield member 85 is separate from the sidewall portion 1b, which increases the possibility of an occurrence of a leak due to defective bonding.

To the contrary, the first optical member 5 bonded from the outside is pressed to the sidewall portion 1b including the bonding material if the inside pressure of the first package 1 is negative as opposite to the shield member 85, which is effective to decrease the possibility of an occurrence of a leak, but if the inside pressure of the first package 1 is positive, the pressure is applied in such a direction that the first optical member 5 is separated from the sidewall portion b, which increases the possibility of an occurrence of a leak due to defective bonding.

In other words, with the shield member 85 and the first optical member 5 arranged so that the sidewall portion 1b of the first package 1 is put between them, a pressure is applied in such a direction that at least one of the shield member 85 and the first optical member 5 is pressed to the sidewall portion 1b whether the inside pressure of the first package 1 is positive or negative, and therefore it becomes possible to reduce occurrences of a leak caused by a difference of atmospheric pressure or defective bonding.

With this configuration, the air-tightness of the inside of the first package 1 can be improved, whereby it becomes possible to prevent an occurrence of disadvantages caused by a condition that the light source, the light receiving element, or the optical member to be arranged inside the first package 1 is exposed to the air or includes moisture, which leads to achieving an optical pickup with an extremely high reliability.

For the material of the shield member 85, it is preferable to use a material having favorable transparency such as resin or glass which does not decrease an efficiency of utilizing light. In addition, a thinner shield member is preferable to an extent that it does not cause any significant problem since it is effective to minimize an expansion of a diameter of the light.

Furthermore, the bonding power of the shield member 85 to the sidewall portion 1b is preferably different from that of the first optical member 5 to the sidewall portion 1b. Particularly, with the bonding power of the shield member 85 directly facing the inside of the first package 1 to the sidewall portion 1b being greater than that of the first optical member 5, a leak between the first optical member 5 and the sidewall portion 1b can be inhibited to extend to the inside of the first package 1 even if such a leak may occur. It is effective to largely decrease a possibility of an occurrence of a leak into the inside of the first package 1. As a means for realizing this configuration, there can be provided a method of using a bonding material having a greater bonding power for the bonding between the shield member 85 and the sidewall portion 1b in comparison with that of the bonding material used for the bonding between the first optical member 5 and the sidewall portion 1b.

Still further, preferably a difference of a pressure is as small as possible between a space A enclosed by the first package 1 and the shield material 85 and a space B enclosed by the sidewall portion 1b, the shield member 85, and the first optical member 5. A pressure is always applied to the shield member 85 between the space A and the space B due to a difference of a pressure between the space A and the space B. If a vibration caused by hand carriage or car mounting of the product is entered into the shield member 85 in this condition, the shield member 85 significantly vibrates or is deflected and it may change minutely an angle of incidence formed by an incident light and the shield member 85,]] and it may further lead to a degradation of optical characteristics. From this viewpoint, the difference of the pressure (P) is preferably as small as possible between the space A and the space B. Specifically, P is preferably 0.3 (atm) or lower.

The same conditions are preferably applied to the spaces surrounded by the second package 8 and the second optical member 11.

Next, the optical path dividing means 15 is used to guide light emitted from both of the light source 2 and the light source 9 to the optical disk. Generally a half mirror or a polarizing separation (polarization beam splitter) film is used as a material of the optical path dividing means 15, and more preferably it has characteristics of transmitting the light from the light source 2 at a high ratio and of reflecting the light from the light source 9 at a high ratio. If so, a loss of the light in the optical path dividing means 15 can be limited to the minimum and therefore an efficiency of utilizing the light can be increased. The increase of the efficiency of utilizing the light is preferable since it makes it possible to limit an amount of light emitted from the light source 2 or the light source 9, whereby the life of the light source 2 or the light source 9 can be elongated, which leads to an improvement of the reliability of an optical disk unit on which this optical pickup is mounted.

Preferably a reflection means having a wavelength selecting function is used as the optical path dividing means 15 having the above characteristics. The reflection means having this wavelength selecting function transmits light having a certain wavelength while it reflects light having another wavelength, and particularly in this embodiment, with the optical path dividing means 15 configured so as to transmit almost all the light from the light source 2 and to reflect almost all the light from the light source 9, the efficiency of utilizing the light from the light source 2 and the light source 9 can be set to the highest. Accordingly, a great load is not applied almost at all to either the light source 2 or the light source 9, and therefore the lives of the light source 2 and the light source 9 can be averaged and it favorably leads to actualizing a long life of the optical pickup.

Next, a color (chromatic) aberration correcting (compensating) means 500, which is placed between the light source 9 and the optical path dividing means 15, is used to correct a color (chromatic) aberration which may occur in a luminous flux which is emitted from the light source 9 and converges on a disk 19. As the above color (chromatic) aberration correcting (compensating) means 500, there may be a hologram having a color (chromatic) aberration correcting (compensating) means or a lens having a color (chromatic) aberration correcting (compensating) means; it is preferable to use the hologram to actualize a smaller optical pickup. It is because it is effective to lower a ratio of a volume of the color (chromatic) aberration correcting (compensating) means to the optical pickup and it further decreases the size of the optical pickup.

With this color (chromatic) aberration correcting (compensating) means 500 arranged, it is possible to correct an occurrence of a color (chromatic) aberration caused by a change of a refractive index of a glass material or the like due to a difference between a wavelength of the light emitted from the light source 2 and that of the light emitted from the light source 9, and therefore it becomes possible to resolve a problem that the light condensed by the condenser is not condensed on the record medium due to a presence of a color (chromatic) aberration. In other words, it is unnecessary to use an objective lens which is optimum-designed according to a type of the disk and a wavelength of the light source. Accordingly, without a configuration in which an objective lens is exchanged according to a type of the disk and that of the light source, only a single condenser 17 can be used to favorably condense both of the light from the light source 2 and the light from the light source 9 on a high-density optical disk 18 and a low-density optical disk 19, respectively.

Although the color (chromatic) aberration correcting (compensating) means 500 is arranged between the light source 9 and the optical path dividing means 15 in this embodiment, it may be placed between the optical path dividing means 15 and the condenser 17 as a configuration in which it does not so much affect the characteristics of the light from the light source 2 with an amount of application to the light from the light source 2 made smaller than an amount of application to the light from the light source 9. With this configuration in which the color (chromatic) aberration correcting (compensating) means 500 can be placed in any position between the light source 9 and the condenser 17, a degree of freedom in designing an optical pickup can be increased so as to actualize a smaller optical pickup easily.

Although the quarter-wavelength plate 4 and the quarter-wavelength plate 14 are mounted on the first optical member 5 and the second optical member 11, respectively, in this embodiment, they may be placed in any position between an end surface of the optical path dividing means 15 in the side of a collimater lens 16 and the optical disk, instead. With this configuration, one quarter-wavelength plate can be omitted though conventionally two quarter-wavelength plates are needed, and therefore the productivity can be enhanced and a low-cost optical pickup can be achieved. Particularly, the plate is preferably formed on the end surface of the optical path dividing means 15 in the side of the collimater lens 16 previously in the configuration since it reduces the number of processes so as to improve the productivity.

The collimater lens 16 is used to convert diffusion angles of the light emitted from the light source 2 and the light source 9 to parallel light which has been diffused light before it is incident.

The condenser 17, which is used to condense the light which has been incident and then to form a beam spot on the optical disk, is supported by a lens driving means so as to shift in a focusing or tracking direction. The collimater lens 16 is effective to increase a quantity of light which is incident on the condenser 17, and therefore an efficiency of utilizing the light is increased. Accordingly, it becomes possible to use the light source 9 at an output significantly lower than the maximum output, so as to elongate the life of the light source 9, whereby the reliability of the optical pickup device is increased.

In this embodiment, the collimater lens 16 and the condenser 17 are designed so as to be optimum for the light source 2 and the high-density optical disk 18, and the luminous point 2a of the light source 2 is arranged on a focus of the collimater lens 16.

Furthermore, although the color (chromatic) aberration correcting (compensating) means 500 is provided with being separated from the light source package 8 and the optical path dividing means 15 in this embodiment, it may be formed on the light source package 8 after an adjustment of an optical axis with the light source 9 or may be monolithically integrated with the optical path dividing means 15 or directly formed on its end surface in the side of the light source package 8. It simplifies an assembly process of the optical pickup, so as to increase the productivity of the optical pickup.

Still further, instead of using the collimater lens 16, for example, the first optical member 5 and the second optical member 11 may be provided with a function of converting diffusion angles of the light. In this configuration, the collimater lens 16 need not be provided, and therefore precise positioning becomes unnecessary and the number of the components is reduced, whereby the productivity is increased.

Next, an operation of the optical pickup device having these configurations will be described with reference to drawings.

First, the high-density optical disk 18 is installed in a spindle motor of the disk unit. Mostly the high-density optical disk 18 is made of two disk substrates each having a thickness of approx. 0.6 mm with being laminated to be formed. In this condition, the optical pickup is operated.

The luminous flux 2b emitted from the luminous point 2a of the light source 2 is transmitted through the optical path dividing means 6 on the first inclined plane 5a of the first optical member 5, changes its polarization direction from a linear polarization to a circular polarization at the quarter-wavelength plate 4, and is incident on the optical path dividing means 15. Then, after it is transmitted through the optical path dividing means 15 almost entirely, it is converted to a luminous flux 2c at the collimater lens 16 and condensed as shown by a luminous flux 2d. The condenser 17 is designed with a numerical aperture of approx. 0.6 so that it can focus light into a minute spot to an extent that data on the high-density optical disk 18 can be reproduced.

Next, by using FIG. 1, an explanation will be made for an optical path of forward light for a reproduction of the low-density optical disk 19. In this embodiment, the low-density optical disk 19 has a thickness of approx. 1.2 mm. Light 9b emitted from a luminous point 9a of the light source 9 is transmitted through the optical path dividing means 12 on the first inclined plane 11a of the second optical member 11, changes its polarization direction from a linear polarization to a circular polarization at the quarter-wavelength plate 14, and is incident on the optical path dividing means 15. Then, after it is reflected by the optical path dividing means 15 almost entirely, it is converted to a luminous flux 9c at the collimater lens 16, and then condensed as shown by a luminous flux 9d on the low-density optical disk 19 by the condenser 17.

At this point, a focal length L2 of the condenser 17 for a reproduction of the low-density optical disk 19 is set to a length longer than a focal length L1 of the condenser 17 for a reproduction of the high-density optical disk 18. A difference between the focal lengths is preferably 1.0 mm or lower, otherwise, 0.6 mm or lower since it makes it almost unnecessary to drive greatly an actuator which holds the condenser 17 at a reproduction on various types of a plurality of disks. Accordingly, the position of the focus can be easily adjusted and therefore it is possible to cope with a difference of a thickness between the substrates very favorably.

With this configuration in which light from a plurality of light sources focuses in different positions on the record mediums, it becomes possible to reproduce data on the record mediums whose substrate thickness is different from each other by means of an identical optical pickup device. In other words, it becomes possible to record and reproduce data on the low-density optical disk 19 having a thickness of 1.2 mm such as a CD-ROM and data on the high-density optical disk 18 which is a single substrate having a thickness of 0.6 mm or a DVD with the double-sided lamination of the single substrate by means of an identical optical pickup device.

The focal length L1 and the focal length L2 can be changed to some extent by setting a movable range of the optical member such as the condenser, and therefore it is possible to reproduce data on an optical disk made of laminated high-density optical disks or on an optical disk having a plurality of record layers.

Next, an explanation will be made for an optical path up to the point at which reflected light from the high-density optical disk 18 or the low-density optical disk 19 is detected, in other words, a backward path.

First, a reproduction on the high-density optical disk 18 is described. Reflected light from the high-density optical disk 18 is transmitted through the optical path dividing means 15 along almost the same optical path as the forward path, converted by the quarter-wavelength plate 4 from the circular polarization to the linear polarization which crosses at right angles to the first polarization direction, and then incident on the optical path dividing means 6 on the first inclined plane 5a of the first optical member 5. Since the optical path dividing means 6 is made of a polarizing separation (polarization beam splitter) film in this embodiment, the incident light is reflected almost entirely and then guided to the reflection means 7. The reflection means 7 is composed of optical elements satisfying a certain object; there are provided elements for forming focus error signals here. Accordingly, the light reflected by the reflection means 7 is condensed on the light receiving means 3 while forming a focus error signal to detect a signal depending on the data recorded on the high-density optical disk 18, a track error signal, and a focus error signal.

Next, a reproduction on the low-density optical disk 19 will be described. Reflected light from the low-density optical disk 19 is reflected by the optical path dividing means 15 along almost the same optical path as the forward path, converted by the quarter-wavelength plate 14 from the circular polarization to the linear polarization which crosses at right angles to the first polarization direction, and then incident on the optical path dividing means 12 on the first inclined plane 11a of the second optical member 11. Since the optical path dividing means 12 is made of a polarizing separation (polarization beam splitter) film in this embodiment, the incident light is reflected almost entirely and then guided to the reflection means 13. The reflection means 13 is composed of optical elements satisfying a certain object; there are provided elements for forming focus error signals here. Accordingly, the light reflected by the reflection means 13 is condensed on the light receiving means 10 while forming a focus error signal to detect a signal depending on the data recorded on the low-density optical disk 19, a track error signal, and a focus error signal.

If a plurality of light sources are arranged in different positions as described above, mostly there is a great difference in a wavefront aberration which occurs in the light emitted from respective light sources and therefore it is necessary to use a lens having an aberration correcting (compensating) function effective for correcting (compensating) this wavefront aberration as a condenser, which often results in causing a necessity of using a plurality of condensers matching each luminous flux in general. In this embodiment, this problem is avoided by optimizing a distance between the luminous point 2a or 9a of the light source 2 or 9 and the collimater lens, and this point will be now described below.

Figure 4:
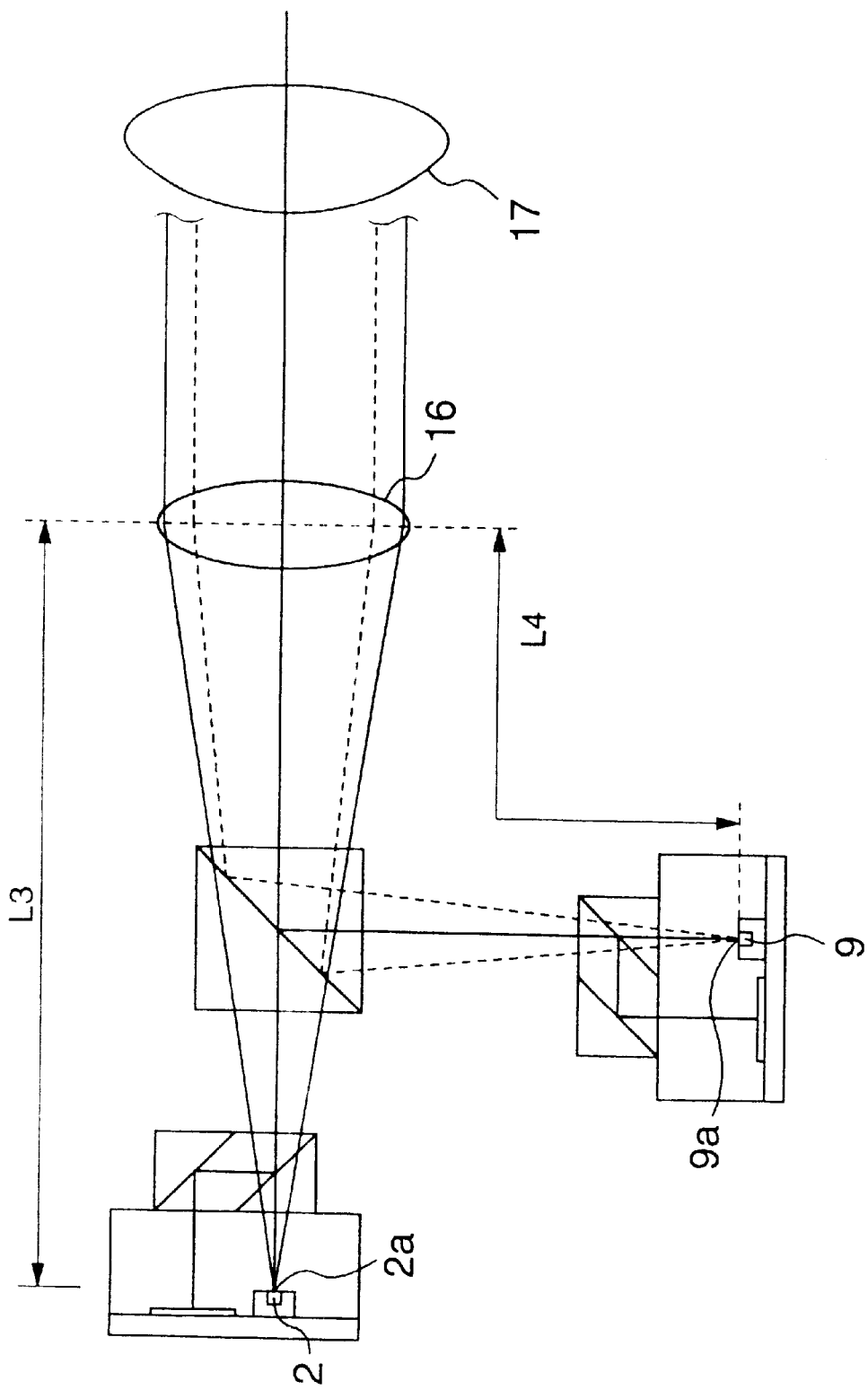
FIG. 4 is a diagram illustrating a relationship between a luminous point and a collimating lens of the first embodiment according to the present invention.

Referring to FIG. 4, there is shown a relationship between the luminous point and the collimater lens in the first embodiment. In FIG. 4, reference numeral L3 indicates an effective focal length from the collimater lens 16 to the luminous point 2a, and reference numeral L4 indicates an effective focal length from the collimater lens 16 to the luminous point 9a. Furthermore, referring to FIG. 5, there is shown a relationship between a wavefront aberration amount and a distance ratio depending on a shift amount of the condenser of the first embodiment according to the present invention. In other words, when a ratio of L3 to L4 is changed, a wavefront aberration amount which occurs at an incidence on the condenser is compared between a case in which the condenser 17 shifts by 500 $\mu$m in a tracking direction (indicated by a thick line) and a case in which it does not shift in the tracking direction at all (indicated by a thin line).

In general, a condenser under reproduction on an optical disk has a possibility of shifting by a maximum of 500 $\mu$m in a tracking direction. In addition, taking into consideration that it is assumed that 0.07 $\lambda$ (where $\lambda$ indicates a wavelength of light) or lower of a wavefront aberration amount as an RMS value is allowed to converge light which has been incident on the condenser into the optical disk effectively, and assuming that the wavefront aberration amount is 0.07

λ or lower at the maximum shift amount (500 μm) of the condenser 17 for the light from the luminous point 9a in which the aberration amount is relatively large and the incidence conditions to the condenser 17 become severe, light from both of the luminous points will converge on the optical disk independent of the shift amount of the condenser 17 after it is incident on the condenser 17. To satisfy this condition, apparently as shown in FIG. 3, the ratio of L3 to L4 (L4÷L3=H, it is described as hereinafter, H) is preferably within a range of $0.50 \leq H \leq 0.75$.

If H is within this range, it is possible to limit the amount of a wavefront aberration which may occur in the light reflected by the record medium and return, and therefore the light can be favorably incident on the light receiving means which receives the reflection light so as to achieve superior signal characteristics.

Figure 5:
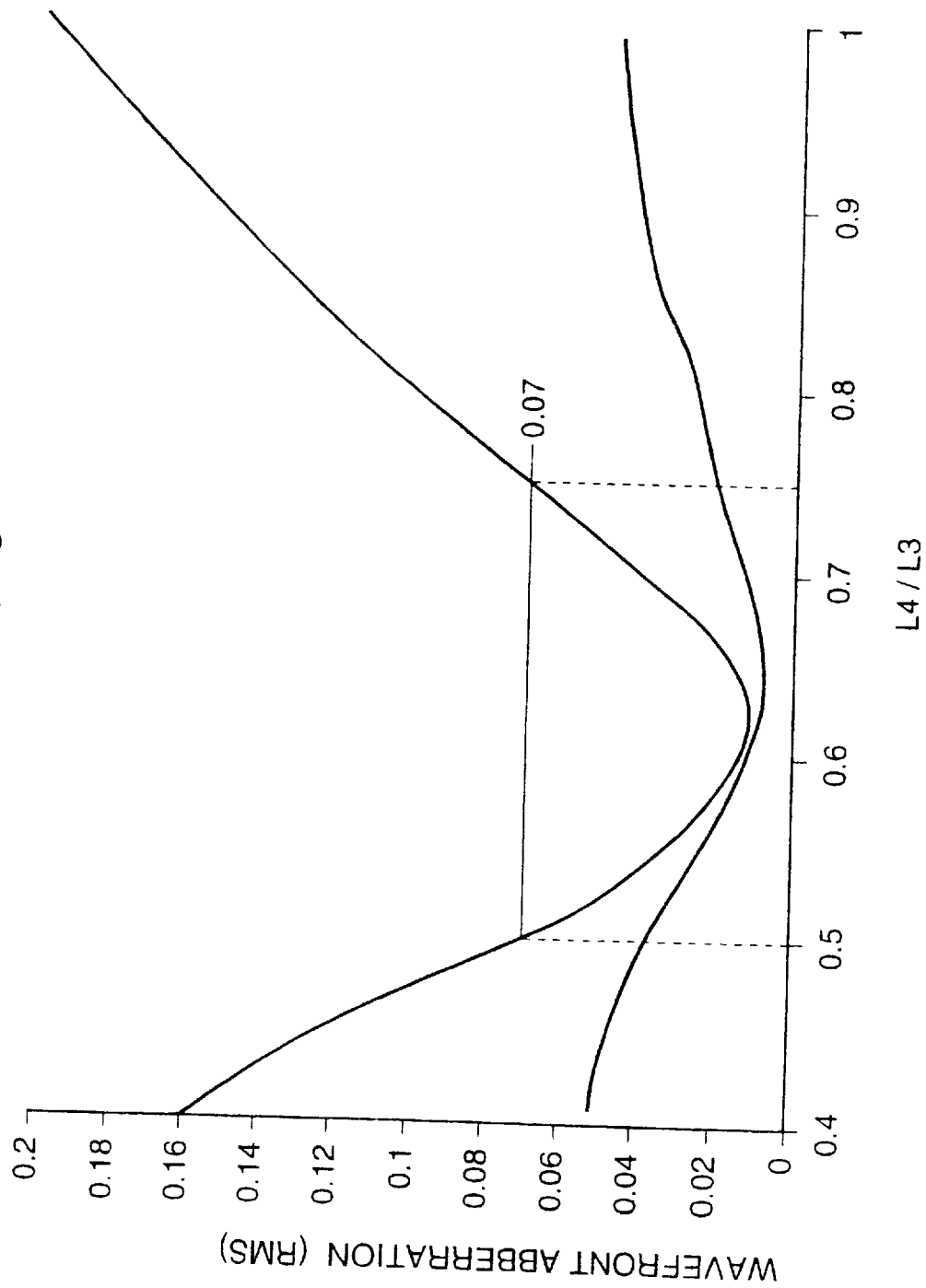
FIG. 5 is a diagram illustrating a relationship between a wavefront aberration amount and a distance ratio depending on a shift amount of a condenser of the first embodiment according to the present invention.

Further, if the wavefront aberration amount is 0.04 λ or lower as an RMS value under the same conditions, the light incident on the condenser 17 is converged very precisely on the optical disk independently of a shift amount of the condenser 17 whether the incident light is emitted from either luminous point 2a or 9a. To satisfy this condition, apparently as shown in FIG. 5, the ratio of L3 to L4 (H) is preferably within a range of $0.53 \leq H \leq 0.70$.

With an arrangement of the optical system so that the value of H is within the above range, the wavefront aberrations in every luminous flex can be theoretical threshold or lower values in an optical pickup having a plurality of types of luminous flux in a single optical system, and therefore every luminous flux can be condensed on the optical disk by using a single condenser 17.

Accordingly, only one condenser 17 is needed for condensing, so that the number of condensers can be reduced. In addition, if a plurality of condensers are used, it is not required to arrange a plurality of optical systems corresponding to them nor lens switching means, whereby it becomes possible to make the optical pickup smaller, to increase the productivity due to a decrease of the number of the components, and further to improve the reliability of the optical pickup and to increase the operation speed due to omission of a complicated mechanism.

Figure 6:
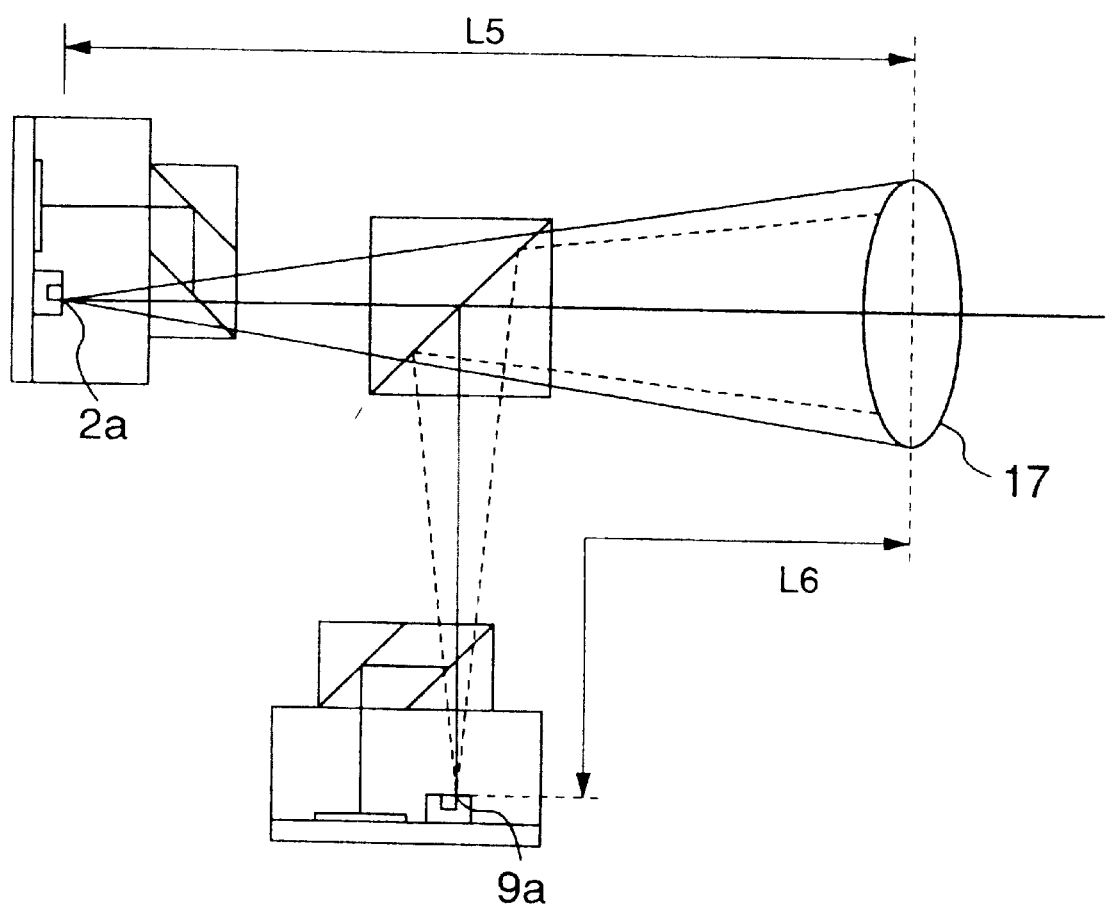
FIG. 6 is a diagram illustrating a relationship between a luminous point in a finite optical system and the condenser of the first embodiment according to the present invention.

Although an infinite optical system having the collimater lens 16 is used in this embodiment, a finite optical system without the collimater lens as shown in FIG. 6 may be also used. Referring to FIG. 6, there is shown a relationship between luminous points and a condenser in the finite optical system in the first embodiment according to the present invention. In FIG. 6, the configuration is the same as for the infinite optical system except that reference numeral L5 indicates an effective focal length from the condenser 17 to the luminous point 2a, and reference numeral L6 indicates an effective focal length from the condenser 17 to the luminous point 9a. Still further, also in an optical pickup in which one is an infinite optical system and the other is a finite optical system, the relationship can be defined in the same manner.

The above phenomenon may be caused by an extremely small spherical surface aberration as a whole since a degree of a spherical surface aberration caused by a difference of a thickness between the high-density optical disk and the low-density optical disk is the same as that of a spherical surface aberration caused by a deviation of the position of the luminous point 9a and they have inverse signs which negates the spherical surfaces each other.

Furthermore, referring to FIG. 19, there is shown a diagram of a relationship between a lens shift amount and a wavefront aberration amount depending on a presence or absence of a color (chromatic) aberration correction of the first embodiment according to the present invention, illustrating the wavefront aberration amount of luminous flux emitted from the light source 9 and converging on the disk 19 when the condenser 17 is shifted in the tracking direction assuming that the H value is 0.63 in a case that the color (chromatic) aberration correcting (compensating) hologram 500 is arranged between the light source 9 and the collimater lens 16 (indicated by a thick line) and in a case that it is not arranged between them (indicated by a thin line). In general, a condenser under reproduction on an optical disk has a possibility of shifting by a maximum of 500 μm in a tracking direction. To limit the wavefront aberration amount within the above tolerance in this range of the lens shift amount, as apparently shown in FIG. 19, it is required to install the color (chromatic) aberration correcting (compensating) hologram 500. The color (chromatic) aberration correcting (compensating) hologram 500 is preferably installed between the light source 9 and the optical path dividing means 15 so as not to affect the luminous flux which is emitted from the light source 2 and converges on the disk 18.

Unless the color (chromatic) aberration correcting (compensating) hologram 500 is installed, a wavefront aberration at a lens shift becomes relatively great. It is because the collimater lens 16 and the condenser 17 are designed so as to be optimum to the wavelength of the light emitted from the light source 2, and therefore a color (chromatic) aberration is generated to the luminous flux emitted from the light source 9 having a different wavelength. A color (chromatic) aberration is caused by a change of a refractive index of a glass material or the like composing the lens caused by a wavelength, which causes a change of a refraction power of the lens and a deviation of a focus position of the luminous flux transmitted through a central portion of a lens from that of the luminous flux transmitted though a peripheral portion of the lens.

Accordingly, the color (chromatic) aberration correcting (compensating) means 500 in this embodiment corrects the deviation of the focus position of the luminous flux transmitted through the central portion of the collimater lens 16 or the condenser from that of the luminous flux transmitted through the peripheral portion of the lens, so that all the light rays transmitted through the lens converge on almost a single focus position.

In this embodiment, a correction is made for a spherical surface aberration caused by a difference of a thickness between the disks with optimizing a distance between the luminous point 9a of the light source 9 and the collimater lens 16, and a correction is made for a color (chromatic) aberration caused by a difference of a wavelength between the light sources with installing the color (chromatic) aberration correcting (compensating) means between the luminous point 9a of the light source 9 and the collimater lens 16, so that the wavefront aberrations in every luminous flux can be tolerances or lower in an optical pickup having a plurality of types of luminous flux in a single optical system, and therefore every luminous flux can be condensed on the optical disk by using a single condenser 17.

[Second Embodiment]

A second embodiment of the present invention will be described below with reference to the accompanying drawings.

Figure 7:
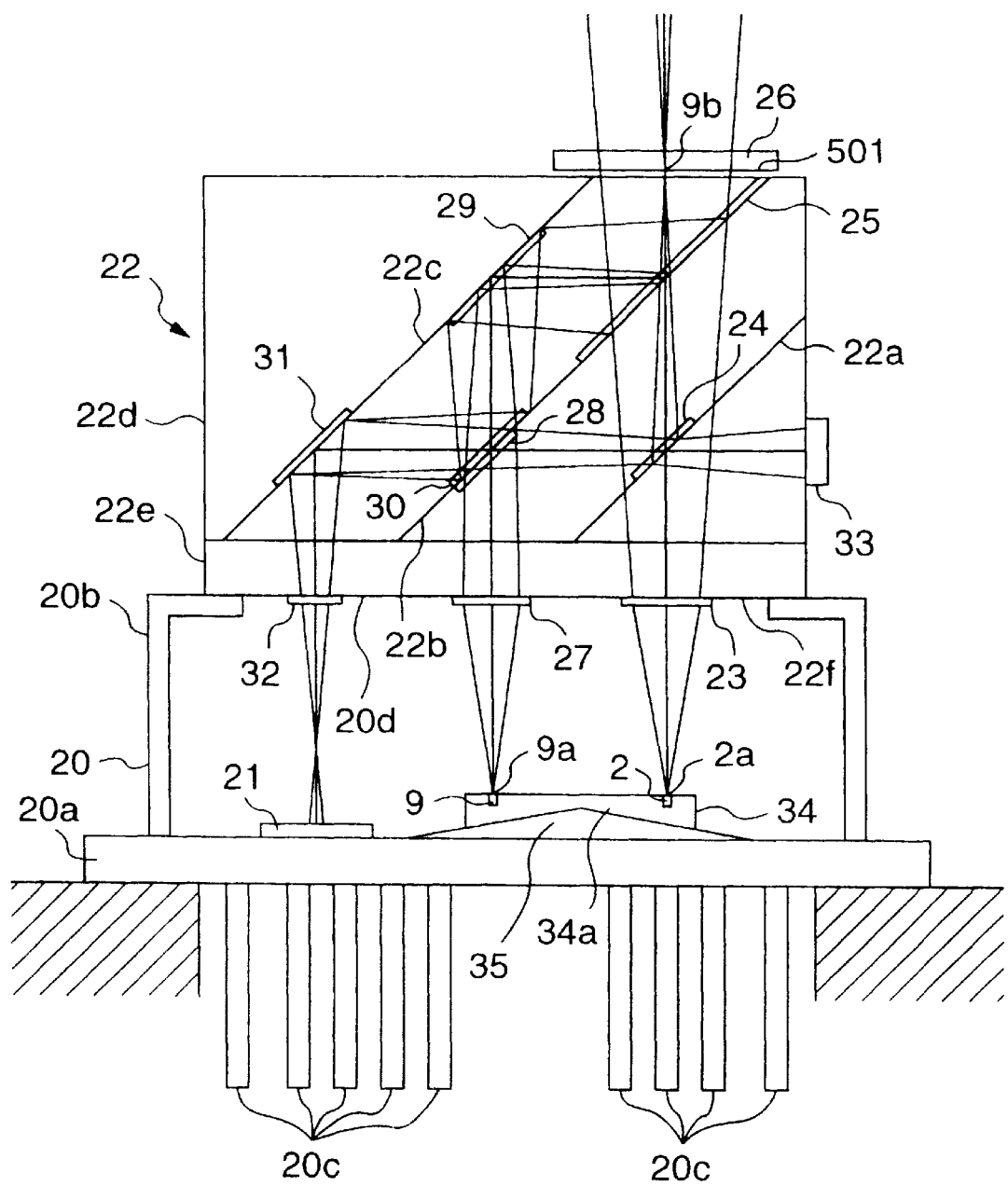
FIG. 7 is a cross section of an integrated optical head of a second embodiment according to the present invention.

Referring to FIG. 7, there is shown a cross section of an integrated optical head of a second embodiment according to the present invention, In FIG. 7, a package 20 comprises a light source 2 for emitting light for a high-density optical disk 18 and a light source 9 for emitting light for a low-density optical disk 19, a substrate portion 20a on which a light receiving means 21 or the like are mounted to receive light reflected by a record medium, and a sidewall portion 20b arranged so as to enclose these members. The substrate portion 20a and the sidewall portion 20b and others can be formed either integrally or separately. If they are integrally formed, an assembly process can be simplified so as to increase the productivity.

Materials of the package 20 are almost the same as for the first package 1 of the first embodiment, and therefore their explanation is omitted here.

The package 20 discharges a heat generated by the light sources 2 and 9 to the outside by making the substrate portion 20a and, if necessary, the sidewall portion 20b in contact with a carriage having a great thermal capacity. Accordingly, as an area of the substrate portion 20a in contact with the carriage becomes larger, the package 20 obtains more favorable heat dissipation effects.

Still further, in the substrate portion 20a, there are provided terminals 20c for supplying power to the light sources 2 and 9 and for transmitting electric signals from the light receiving means 21 to an arithmetic circuit. These terminals 20c have almost the same configuration as for the terminals 1c described in the first embodiment, and therefore the explanation is omitted here.

There can be various combinations of the light source 2 and the light source 9 contained in the package 20, for example, 650 nm and 780 nm, 490 nm and 650 nm, or 400 nm and 650 nm. In other words, preferably a wavelength of one light source is longer and that of the other light source is shorter than it. The number of installed light sources can be either of two and three.

In an opening 20d of the package 20, an optical member 22 is bonded by bonding medium such as bonding glass or bonding resin.

As shown in the drawing, it is preferable to enclose the inside space surrounded by the package 20 and the optical member 22, in other words, the space in which the light sources 2 and 9 and the light receiving means 21 are arranged. With this configuration, it becomes possible to prevent impurity such as dust or moisture from being included into the inside of the package, whereby the performances of the light sources 2 and 9 and the light receiving means 21 can be maintained and it also prevents a degradation of the optical characteristics of the emitted light. Further, it is more preferable to previously enclose $N_2$ gas or inactive gas such as a dry air or Ar gas in the space enclosed by the package 20 and the optical member 22 since it prevents a deterioration of optical characteristics caused by sweating on the surface of the optical member 22 or the like facing the inside of the package 20 and a degradation of the characteristics caused by oxidation of the light sources 2 and 9 or the light receiving means 21.

In addition, in comparison with a case in which the light source 2 is contained in a different package from that of the light source 9, they can have the same environment inside the package, so as to achieve the same operating conditions for the light source 2 and the light source 9. Accordingly, it is effective to prevent an occurrence of disadvantages such as a difference of a life between the light source 2 and the light source 9 caused by a difference of the operating conditions between them, whereby the reliability of the optical pickup can be enhanced.

The optical member 22 is used to guide the light emitted from the light source 2 and the light source 9 to a given optical path and to guide the returning light reflected by the high-density optical disk 18 or the low-density optical disk to the light receiving means 21.

The optical member 22 comprises a first substrate 22d including a first inclined plane 22a, a second inclined plane 22b, and a third inclined plane 22c and a second substrate 22e bonded to an end surface of the first substrate 22d in the side of the light source.

The optical member 22 is preferably formed in a shape of a parallel planar plate as a whole since it is effective to prevent an occurrence of aberration, whereby favorable reproduction signals or focus tracking signals can be formed. Furthermore, preferably the optical member 22 is mounted so that its top and bottom are precisely perpendicular to the optical axis of the transmitted light since it is effective to prevent an occurrence of the non-point aberration (astigmatism) and a degradation of reproduction signals caused by an unfocused spot.

As for materials of the optical member 22, it is preferable to use materials having a high light transmission such as glass or resin since it is effective to prevent a decrease of the quantity of light and a degradation of the optical characteristics of the light transmitted through the optical member 22. Particularly, glass is preferable as a material of the optical member 22 since it does not cause a birefringence and therefore the characteristics of the transmitted light can be favorably maintained. Furthermore, it is more preferable to use optical glass having a low wavelength dispersion, in other words, a high Abbe's number such as a BK-7 since it is effective to prevent an occurrence of an aberration of a spherical surface caused by a fluctuation of a wavelength.

At this point, the optical member 22 has a configuration in which there are respective normal vectors at almost the same angle of inclination as for the first inclined plane 22a, the second inclined plane 22b, and the third inclined plane 22c in almost the same direction. With the first inclined plane 22a, the second inclined plane 22b, and the third inclined plane 22c formed in this manner, a predetermined optical length can be achieved while decreasing the length of the first substrate 22d and therefore that of the optical member 22 in its height direction, whereby the size of the optical pickup can be reduced while the given optical characteristics are maintained. Particularly, the center of gravity of the optical head is placed in a position near an area in which the package 20 is installed when the package 20 comprising the optical member 22 is installed into a carriage, and therefore a high accuracy of installation can be achieved and a deviation of a position at bonding be prevented at a high percentage.

In addition, various optical elements can be arranged in the positions where light is reflected on respective planes, and therefore predetermined optical characteristics can be given to the light incident on the optical member 22 when it is transmitted.

Particularly when the light from a plurality of light sources is guided to an identical optical path as described in this embodiment, preferably at least three planes are formed with being inclined in the same direction in the optical member 22, so that the light from at least one light source is reflected twice or more, whereby it becomes possible to optimize the optical characteristics of the light emitted from the light source 2 or the light source 9 before the light is transmitted from the optical member 22 by passing the light through various optical members formed on respective inclined planes.

With this configuration, a long distance can be secured from the light source 2 or the light source 9 to an emission surface of the optical member 22 and therefore to the contrary a distance between the optical member 22 and the record medium can be decreased, so that the size of the optical pickup can be reduced. In addition, it becomes possible to give optical characteristics required for irradiating the record medium in the optical member 22, and therefore it is unnecessary to arrange specially various optical members in the optical path of the light which has been emitted from the optical member 22, whereby the number of the components or an assembly cost can be reduced.

Additionally, with the first inclined plane 22a, the second inclined plane 22b, and the third inclined plane 22c having the same angle of inclination, the optical member 22 can be easily manufactured at a high precision by bonding a plurality of parallel plane plates with being combined on which given optical elements are previously formed and cutting off at a given angle, and therefore the productivity of the optical member 22 is significantly increased. Furthermore, due to the predetermined angle, an optical axis can be easily adjusted so as to reduce the time and processes required for axis adjustment.

The angle of inclination on the first inclined plane 22a, the second inclined plane 22b, and the third inclined plane 22c to incident light is preferably within the range of 30 deg to 60 deg, further preferably approx. 45 deg. The first inclined plane 22a, the second inclined plane 22b, and the third inclined plane 22c are preferably apart from each other by a given distance from a viewpoint of the optical elements formed on respective inclined planes. Unless the optical elements are apart from each other by a given distance, it increases a possibility of causing a disadvantage that a small quantity of light transmitted without being reflected comes into the optical path of emitted luminous flux and becomes a component of a stray light.

Assuming that L is the given distance, if the angle of inclination of the inclined planes is smaller than 30 deg, the optical member 22 is made thicker at least by a difference of the incident light position $2L/\sqrt{(3)}$ which is generated until the light is reflected on the first inclined plane 22a and is incident on the second inclined plane 22b or until it is reflected on the second inclined plane 22b and is incident on the third inclined plane 22c, and further if the angle is greater than 30 deg, a difference of an incident light position generated for securing the same distance L, and therefore, a volume of the first optical member 5 is increased by the amount, which makes it hard to reduce the size of the optical pickup unfavorably.

If the angle of inclination of the inclined planes is greater than 60 deg, the volume of the optical member 22 is increased as described above, too. Therefore, downsizing of the optical pickup becomes harder unfavorably.

Particularly if the angle of inclination is approx. 45 deg, it is possible to decrease a difference of the incident light position almost to zero in the light which is reflected on the first inclined plane 22a and is incident on the second inclined plane 22b and the light which is reflected on the second inclined plane 22b and is incident on the third inclined plane 22c, whereby the optical member 22 can be downsized most efficiently, and therefore favorably the size of the optical pickup can be efficiently reduced, too.

Next, various optical elements in the optical member 22 will be explained.

A diffusion angle converting (light beam diameter changing rate along beam axis adjusting) means 23, which is arranged so as to match the optical axis of the light emitted from the light source 2 on an end surface 22f of the second substrate 22e in the side of the light source, is used to decrease a diffusion (light beam diameter changing) angle of the light incident from the light source 2, in other words, to convert the optical path of the light emitted from the luminous point 2a of the light source 2 as if it were emitted from a position farther than a visual position, and it shifts the luminous point in a virtually opposite direction from the record medium so as to elongate the optical path from the light source to the record medium. The diffusion angle converting means 23 is preferably made of a diffraction grating, particularly a hologram since it can transmit light very efficiently. Particularly as a hologram, it is preferable to use one having a cross section in a shape of a staircase of four or more steps or having a serrated cross section, since the light can be used very efficiently and the quantity of light can be prevented from being decreased.

A filter 24, which has a wavelength selectivity, transmits the light guided from the light source 2 almost completely and reflects the light guided from the light source 9.

With the filter 24 formed on the first inclined plane 22a, the light guided from the light source 9 can be reflected without interrupting the light emitted from the light source 2 almost at all, and therefore the light emitted from the light source 2 and the light source 9 can be guided to the record medium at a high percentage. Accordingly, data can be recorded into or reproduced from the record medium without increasing the quantity of light emitted from the light source 2 and the light source 9, and therefore it is possible to prevent the lives of the light source 2 and the light source 9 from being reduced by an operation of the light source 2 or the light source 9 at a high power output. Furthermore, since the light source 2 and the light source 9 can be used at a low power output, an increase of a temperature of the light source 2 and the light source 9 can be restrained, and therefore the oscillation wavelength cannot easily shift at a temperature change. Accordingly, it is possible to provide a high-performance optical pickup which is capable of forming a focus more precisely.

In this embodiment, the filter 24 is also used as a diaphragm for the light from the light source 9. Although the light from both of the light source 2 and the light source 9 is allowed to be incident on a single condenser 17, an incident pupil of the condenser 17 is adjusted so as to focus on a record area of the high-density optical disk 18. Accordingly, in this embodiment, the shape and the material of the condenser 17 are adjusted so as the light from the light source 2 is condensed on the record area of the high-density optical disk 18.

To cause the light from the light source 9 to focus on a record area of the low-density optical disk 19 with this condenser 17, in this embodiment, the condenser is adjusted so that a diameter of the light emitted from the light source 9 and incident on the condenser 17 is smaller than that of the light from the light source 2. Generally, a lens has a stronger condensing application in a peripheral portion than in a central portion. Therefore, if expanded light is incident, the focus is formed in a nearer position; if light which is not expended so much is incident, the focus is formed in a farther position. In this embodiment, the record area of the low-density optical disk 19 is arranged in a farther position than that of the high-density optical disk 18, and therefore by optimizing an incidence aperture of the light from the light source 9 to the condenser 17, the light from the light source 9 can be condensed on the record area of the low-density optical disk 19 by using the condenser 17 which is designed with being tailored to the light from the light source 2.

The incidence aperture is adjusted by the filter 24. In other words, the size of the filter 24 is adjusted so that the light reflected by the filter 24 has a given diameter on the condenser 17.

With the filter 24 having this diaphragm function, a diameter of the light emitted from the light source 9 can be precisely adjusted, and therefore a diameter of the light incident on the condenser 17 can be set to a given size, whereby the light from the light source 9 can be condensed on the record area of the low-density optical disk 19 by the condenser 17. Additionally, in comparison with a case in which the diaphragm is arranged separately, the number of the components can be decreased and further it is possible to omit the time and process for adjusting a distance between the positions of the diaphragm and the light source 9, and therefore the productivity of the optical pickup can be increased.

Furthermore, with the diaphragm arranged in this position, light which is not reflected by the filter 24 though it has been emitted from the light source 9 is directly transmitted through the first inclined plane 22*a* and then discharged to the outside of the optical member 22, and therefore it is possible to prevent the light from becoming stray light in the package 20 even if it is not reflected.

In addition, the filter 24 is arranged in a position where forward light toward the low-density optical disk 19 is incident though backward light reflected by the low-density optical disk 19 is not incident. With the filter 24 having the diaphragm function with being arranged in this position, for example, even if an optical axis of backward light is deviated from a predetermined position by a shift of the condenser 17, the light does not pass through the diaphragm and therefore it is possible to prevent the light originally to be incident on the light receiving means from being interrupted which decreases the quantity of light incident on the light receiving means and to prevent an unbalanced distribution of the quantity of light from being generated. Accordingly, more precise RF signals can be favorably obtained and focusing or tracking servo signals can also be formed more accurately.

Furthermore, the filter 24 has a favorable configuration, since it affects the light from the light source 9 though it does not affect the light from the light source 2 and therefore the diaphragm for the light from the light source 9 does not interrupt the light from the light source 2 nor has bad influence upon the light from the light source 2, whereby, particularly in an optical pickup having a configuration in which a plurality of light sources are contained in a single package and light from a plurality of light sources is condensed in a given position by a single condenser, the light from a plurality of light sources can be incident at a given diameter on the condenser without a bad influence on each light.

A polarizing separation (polarization beam splitter) film 25 transmits light in a specific polarization direction and reflects light in other polarization directions. In this embodiment, the polarizing separation film 25 has a configuration so that it transmits S polarization components emitted from the light sources 2 and 9 and reflects P polarization components. With this polarizing separation film 25, transmitted light can be guided to the record medium without the quantity of the transmitted light being decreased almost at all, whereby favorably it is possible to improve the efficiency of utilizing light, which leads to achieving longer lives of light sources 2 and 9.

A color (chromatic) aberration correcting (compensating) means 501 has almost the same functions as for the color (chromatic) aberration correcting (compensating) means 500 in the first embodiment. In this embodiment, the color (chromatic) aberration correcting (compensating) means 501 is placed at an end surface of the first substrate 22*d* in the opposite side from the light sources so as to match the light axis of the light emitted from the light source, particularly having a function of correcting (compensating) a color (chromatic) aberration which may occur in a luminous flux which is emitted from the light source 9 and converges on a disk 19.

A quarter-wave(length) plate 26 has functions of converting incident light from a linear polarization to an elliptic polarization and of converting an elliptic polarization reflected by the record medium with its rotating direction being inverted to a linear polarization which crosses at right angles to the polarization direction of the above incidence.

A diffusion angle converting (light beam diameter changing rate along beam axis adjusting) means 27, which is arranged so as to match the optical axis of the light emitted from the light source 9 on an end surface 22*f* of the second substrate 22*e* in the side of the light source, is used to make negative a diffusion (light beam diameter changing) angle of the light incident from the light source 9, in other words, to convert the optical path of the light emitted from the luminous point 9*a* of the light source 9 as if it were emitted from a position nearer than a visual position, and it shifts the luminous point in a virtually approaching direction to the record medium. It apparently shifts the luminous point of the light source 9 from the luminous point 9*a* to the luminous point 9*e*, and therefore shortens the optical path from the light source 9 to the record medium. The diffusion angle converting means 27 is preferably made of a diffraction grating, particularly a hologram since it can transmit light very efficiently. Particularly as a hologram, it is preferable to use one having a cross section in a shape of a staircase of four or more steps or having a serrated cross section, since the light can be used very efficiently and the quantity of light can be prevented from being decreased.

A means for forming a plurality of beams 28 is used to reflect incident light with separating it to a plurality of types of luminous flux, and in this embodiment, it separates light passing through the diffusion angle converting means 27 into three types of luminous flux and reflects them toward the filter 24. The means for forming a plurality of beams 28 is preferably formed by a diffraction grating since a plurality of types of luminous flux can be formed efficiently. In this embodiment, it has a configuration in which three types of luminous flux, zero-dimensional light and plus or minus one-dimensional light, generated in the diffraction grating are mainly formed. An area in a given position of a track of the low-density optical disk 19 is irradiated with a plurality of types of luminous flux formed here, and then the quantities of returning light are compared with each other, so as to be subjected to a tracking method commonly called a three-beam method for tracking on the low-density optical disk 19. Therefore, unless the three-beam method is not used as a tracking method, it is preferable to arrange a reflection means simply or an optical device for generating light needed for the tracking method.

Reflection means 29 and 30 are used to reflect light which has been reflected by the polarizing separation film 25 and light which has been reflected by the reflection means 29 in given directions, respectively, and they are preferably made of a metal material having high reflectance such as Ag, Au, and Cu or of a plurality of dielectric materials having various refractive indices.

A diffusion angle converting (light beam diameter changing rate along beam axis adjusting) means 31, which is formed on the third inclined plane 22*c* of the first substrate 22*d*, changes a diffusion (light beam diameter changing) angle of light in the luminous flux reflected by the reflection means 30, in other words, light reflected by the low-density optical disk 19 from a diffusion direction to a convergence direction and reflects directly light in a convergence direction, in other words, the luminous flux reflected by the high-density optical disk 18.

The diffusion angle converting means 31 is preferably made of a diffraction grating, particularly a reflection-type hologram since it can transmit light very efficiently. Particularly as the reflection-type hologram, it is preferable to use one having a cross section in a shape of a staircase of four or more steps or having a serrated cross section since the light can be used very efficiently and the quantity of light can be prevented from being decreased.

In this embodiment, the reflection-type hologram 31 is formed to reflect most of the luminous flux composed of light emitted from the light source 2 as zero-dimensional light and to diffract most of the luminous flux composed of light emitted from the light source 9 to plus one-dimensional light. With this configuration, it is possible to avoid a problem that it is hard to detect RF signals or to form focusing or tracking signals due to a divergence of the luminous flux from the light source 9 on the light receiving means 21 caused by a forward (from the record medium) shift of the luminous point of the light emitted from the light source 9, and therefore a high-performance optical pickup can be actualized so as to form precise signals reliably.

A signal formation means 32, which is placed on an end surface of the second substrate 22e in the side of the light sources, has a configuration so as to guide the light guided from the diffusion angle converting means 31 into a predetermined position of the light receiving means 21 and to give predetermined characteristics to the incident luminous flux to form focusing or tracking signals.

A light receiving means 33, which is placed on a side of the first substrate 22d at almost the same height as for the filter 24 or the means for forming a plurality of beams 28, controls outputs of the light source 2 and the light source 9 by receiving reflected light without passing through the filter 24 in the light emitted from the light source 2 and transmitted light without being reflected by the filter 24 in the light emitted from the light source 9 and then returning the signals as feedback to power supply control circuits of the light source 2 and the light source 9.

With this configuration to guide both of a part of forward emitted light emitted from the light source 2 and then guided to the record medium and a part of forward emitted light emitted from the light source 9 and then guided to the record medium to the light receiving means 33, the same light receiving means 33 is used for monitoring in both of operations of the high-density optical disk 18 and the low-density optical disk 19. In other words, only one light receiving means is needed for monitoring, and therefore the number of components can be reduced.

In addition, with the light receiving means 33 integrated with an optical head containing the plurality of light sources 2 and 9 and the light receiving means 21, a space for an arrangement of the light receiving means 33 can be omitted from the optical pickup, so as to downsize the optical pickup. Furthermore, the light receiving means 33 can be positioned to the light sources 2 and 9 easily and very precisely, and therefore productivity of the optical pickup can be increased and a quantity of output light from the light sources be controlled accurately.

Furthermore, only by installing the optical head for which positioning is completed among respective members into the carriage with adjustments of flyer and rotation directions, a positioning process at an optical pickup assembly can be largely simplified, and therefore productivity of the optical pickup can be significantly increased.

Next, an explanation will be made for a reason why the optical member 22 is formed by two components, the first substrate 22d and the second substrate 22e. The first substrate 22d has a plurality of inclined planes, on which various optical elements are arranged in parallel positions. Accordingly, various optical elements on the first substrate are arranged being inclined to the optical axis of the incident light. Therefore, if an optical element having a high dependence on angles such as a hologram is formed on the first substrate 22d, a tolerance by angles is increased unless positioning is performed at an extremely high precision, which leads to a very high possibility of degrading characteristics of light toward the record medium. It also leads to degrading signal characteristics, which unfavorably results in a cause of decreasing the performance of the optical pickup device. Accordingly, in this embodiment, the diffusion angle converting means 23 and 27 which seem to be highly dependent of angles are formed on the second substrate 22e which is formed separately from the first substrate 22d, so that the diffusion angle converting means 23 and 27 are placed almost perpendicularly to the optical axis of the light emitted from the light source 2 and the light source 9, respectively.

With this arrangement, it is possible to prevent the characteristics of light guided to the record medium from being degraded almost completely, so as to provide a high-performance optical pickup device with less degradation of signal characteristics favorably.

Various optical elements arranged on the second substrate 22e are preferably formed only on one side of the second substrate 22e.

It is because these optical elements are formed in a physical or chemical method such as etching via a mask in a given shape, and therefore a single-side formation is effective to reduce the number of masks and the number of etching times, whereby the number of processes can be decreased, too. In addition, it does not need to turn back a master of the substrate 22e, and therefore it is possible to omit a plurality of times of positioning. Therefore, productivity can be greatly increased and a manufacturing cost be reduced.

In this embodiment, the diffusion angle converting means 23 and 27 and the signal formation means 32 are formed on the end surface 22f of the second substrate 22e in the side of the light sources.

Further in this embodiment, the light sources 2 and 9 are placed so as to be opposite to the second substrate 22e. In other words, in this configuration, the light emitted from the light sources 2 and 9 is incident on the surface 22f of the second substrate 22e and converted to luminous flux having given characteristics by various optical elements formed on the optical member 22 so as to be guided to the record medium.

With this configuration, the light sources 2 and 9 can be positioned with the surface 22f of the second substrate 22e in the side of the light sources being considered as a reference area. In other words, the plurality of light sources can be positioned with a single reference area, whereby the light sources 2 and 9 can be positioned to various optical elements formed on the optical member 22 more precisely, and therefore it becomes possible to prevent a degradation of optical characteristics caused by a deviation of the positions of the light sources 2 and 9 to various optical elements on the optical member 22. In addition, the positioning between the light source 2 and the light source 9 can be easily performed due to the single reference area.

Accordingly, there is almost no deviation of positions between light sources or between a light source and an optical element, so as to achieve a very reliable optical pickup having favorable optical characteristics.

In this embodiment, a distance between the surface 22f opposite to the light sources of the second substrate 22e and the light source 2 is equal to that between the surface 22f and the light source 9. With the light sources 2 and 9 arranged in this relationship, the light sources 2 and 9 can be fixed to, for example, an identical parallel plane member with being put on it, and therefore the height precision of the light sources 2 and 9 can be easily secured. Accordingly, it is possible to prevent a degradation of optical characteristics caused by relatively lower height precision, so as to achieve an optical pickup having favorable record or reproduction characteristics.

Further in this embodiment, the light source mounting portion 34 has a rectangular parallelepiped or plate shape with the light sources 2 and 9 mounted on its top or side. The light source mounting potion 34, which is put on the substrate portion 20a or the sidewall portion 20b as a separate member or a part of the substrate portion 20a or the sidewall portion 20b, dissipates the heat generated by the light sources 2 and 9 in addition to holding the light sources 2 and 9.

With this configuration in which the plurality of the light sources are mounted on the same light source mounting portion, the light sources 2 and 9 can be previously fixed in a predetermined relationship of positions to the light source mounting portion 34, and therefore in assembling the optical head, positioning between the optical member 22 and the light sources 2 and 9 can d performed easily and precisely, so as to increase productivity of the optical head. In addition, it limits an occurrence of a deviation of the positions between the light sources 2 and 9 and the optical member 22, so as to achieve an optical pickup having superior optical characteristics.

Furthermore, with the light sources 2 and 9 arranged on the same surface of the light source mounting portion 34, the light sources 2 and 9 can be installed on the light source mounting portion 34 more easily, and in comparison with a configuration in which they are arranged on different surfaces, the light sources 2 and 9 can be easily connected to electrodes for supplying power to them or ground with wiring. In addition, relative positioning between the light sources 2 and 9 can also be performed easily and precisely.

Still further, although areas in the light source mounting portion on which the light sources are mounted must be chamfered at an extremely high precision, only one area is to be chamfered by arranging the plurality of the light sources on the same area, whereby the manufacturing processes can be reduced and therefore the productivity can be increased in addition to a decrease of a production cost.

Materials of the light source mounting portion 34 are almost the same as for the light source mounting portions 150 and 152 in the first embodiment, and the explanation is omitted here.

Figure 8:
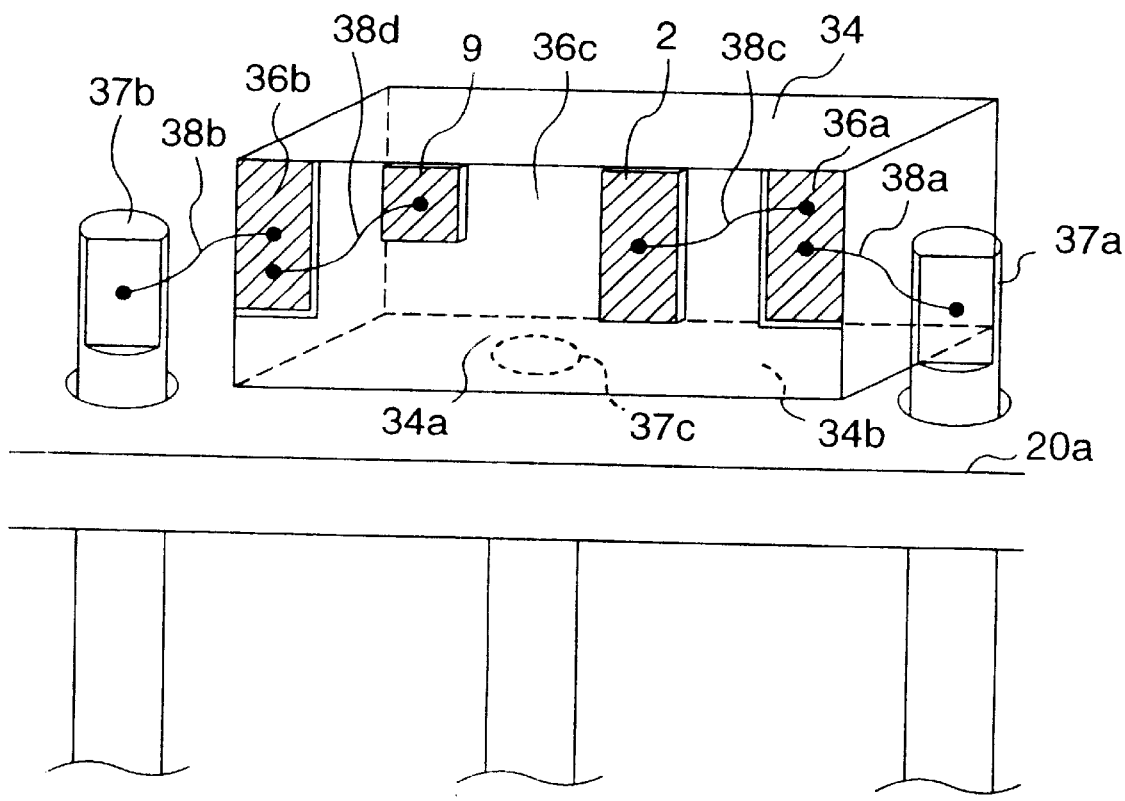
FIG. 8 is an enlarged view of a neighborhood of light sources of the second embodiment according to the present invention.

Next, an explanation will be made for a method of supplying power to the light sources 2 and 9 with reference to accompanying drawings. Referring to FIG. 8, there is shown an enlarged view of a neighborhood of light sources of the second embodiment according to the present invention. The light sources 2 and 9 are arranged almost in parallel on an end surface 34a of the light source mounting portion 34 and electrodes 36a, 36b, and 36c are also placed on it. The electrode 36a is used for supplying power to the light source 2, the electrode 36b is for supplying power to the light source 9, and the electrode 36c is used as a ground of the light sources 2 and 9.

A single terminal 37a out of the plurality of terminals 20c on the package 20 is used to supply power to the light source 2, another terminal 37b out of remaining terminals 20c is used to supply power to the light source 9, and still another terminal 37c out of further remaining terminals 20c is used as a ground.

The terminal 37a and the electrode 36a are electrically connected with each other via a connecting member 38a such as wire bonding, and further the electrode 36a is electrically connected to the top of the light source 2 via a connecting member 38c such as wire bonding in the same manner. Additionally, the terminal 37b and the electrode 36b are electrically connected with each other via a connecting member 38b such as wire bonding, and further the electrode 36b is electrically connected to the top of the light source 9 via a connecting member 38d such as wire bonding in the same manner. Further, the electrode 36c is formed from the end surface 34a of the light source mounting portion 34 to the bottom 34b facing the substrate portion 20a, so as to have a configuration in which the electrode 36c is electrically connected to the terminal 37c automatically by bonding the substrate portion 20a to the light source mounting portion 34 by means of solder or a bonding material having conductivity such as conductive resin.

With the electrodes 36a and 36b which are power supply points to the light sources 2 and 9 are placed on the same plane in this manner, the connection between the electrode 36a and the terminal 37a can be performed simultaneously with the connection between the electrode 36b and the terminal 37b without rotating the light source mounting portion 34, and therefore workability and productivity can be improved in connecting processes. In addition, with forming a plane almost in parallel with an end surface on which electrodes 36a and 36b are placed at the points to which the terminals 37a and 37b are connected and bonding this plane to the electrodes, respectively, angles of the bonded plane need not be adjusted so as to improve workability at bonding as well as reliability at bonding. If these planes are formed in almost the same plane, a moving distance of the bonding device can be minimized at the bonding so as to further improve an efficiency of the work.

Preferably the light sources 2 and 9 are also formed on the same plane as for the electrodes 36a and 36b, whereby the connection between the electrodes and the light sources can be performed more easily, and therefore assembling workability of the optical pickup can be further improved.

The electrodes 36a and 36b are preferably formed on end portions of the end surface 34a of the light source mounting portion 34, respectively. This configuration makes it possible to minimize the both of the distances of the connections between the terminal 37a and the electrode 36a and between the terminal 37b and the electrode 36b, and therefore it is possible to prevent an occurrence of disadvantages such as a short-circuit caused by connecting members 38a and 38b brought in contact with other members having conductivity, a broken connecting member which is too long, or an electrode or a terminal coming off a bonded site.

Figure 9:
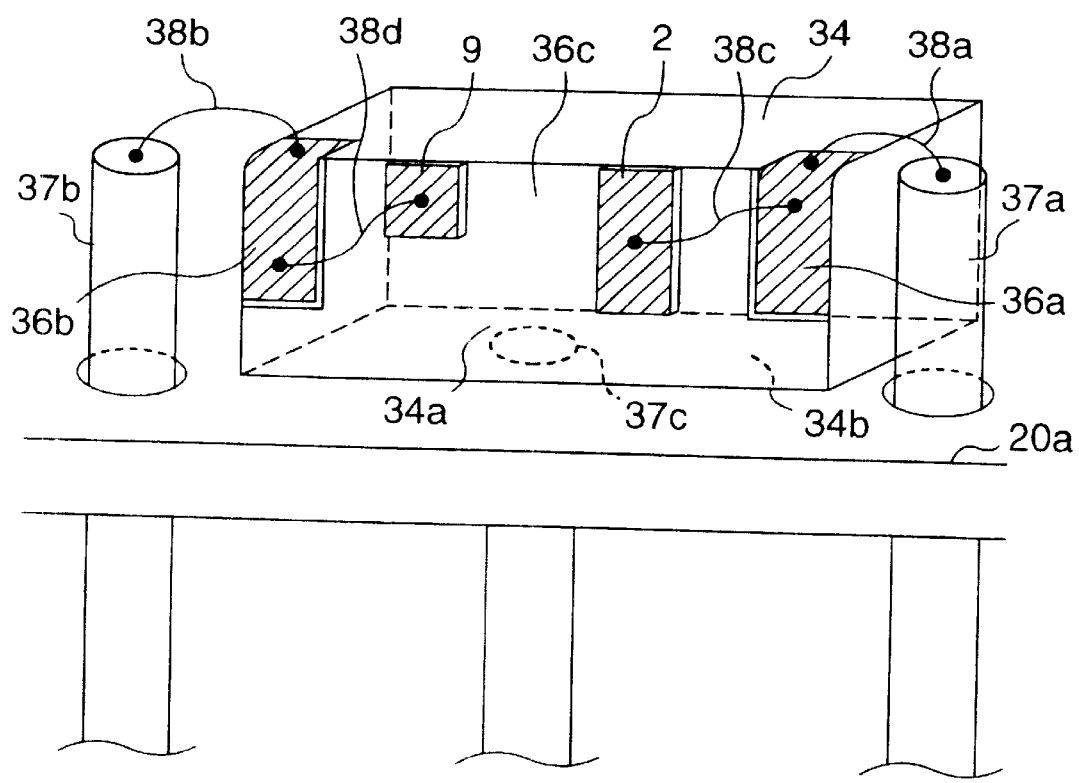
FIG. 9 is an enlarged view of a neighborhood of the light sources of the second embodiment according to the present invention.

Although the electrodes 36a and 36b and the light sources 2 and 9 are arranged on the same plane in this embodiment, the electrodes may be formed on two planes. For example, as shown in FIG. 9, the electrodes are formed on two plane, the top 34c of the light source mounting portion 34 and the end surface 34a thereof, a part on the top of the terminal 37a is connected with a part on the top 34c of the electrode 36a via the connecting member 38a, and a part on the top of the terminal 37b is connected with a part on the top 34c of the electrode 36b via the connecting member 38a. This configuration makes it possible to decrease the number of the connection points existing on the same plane, which prevents disadvantages almost completely such as damaging the connecting member 38c by mistake when installing the connecting member 38a, and therefore an yield of the optical pickup can be improved. The angular portions of the light source mounting portion on which the electrodes are mounted over the two planes are preferably rounded at a predetermined radius (R), since it prevents the electrodes from being damaged by the angular portions so as to maintain a reliable electric contact of the electrodes formed on the respective planes. In the same manner, it is preferable to round the angular portions of the end surface 34a on which the electrode 36c is formed and the bottom 34b.

Next, for a backward emitting light of the light sources 2 and 9, a reflection, a light absorption, or a scattering member is arranged in the same manner as for the light sources 2 and 9 in the first embodiment. Either one reflection member can be installed in each of the light source 2 and the light source 9, or totally one reflection member can be installed for a plurality of light sources.

Figure 10:
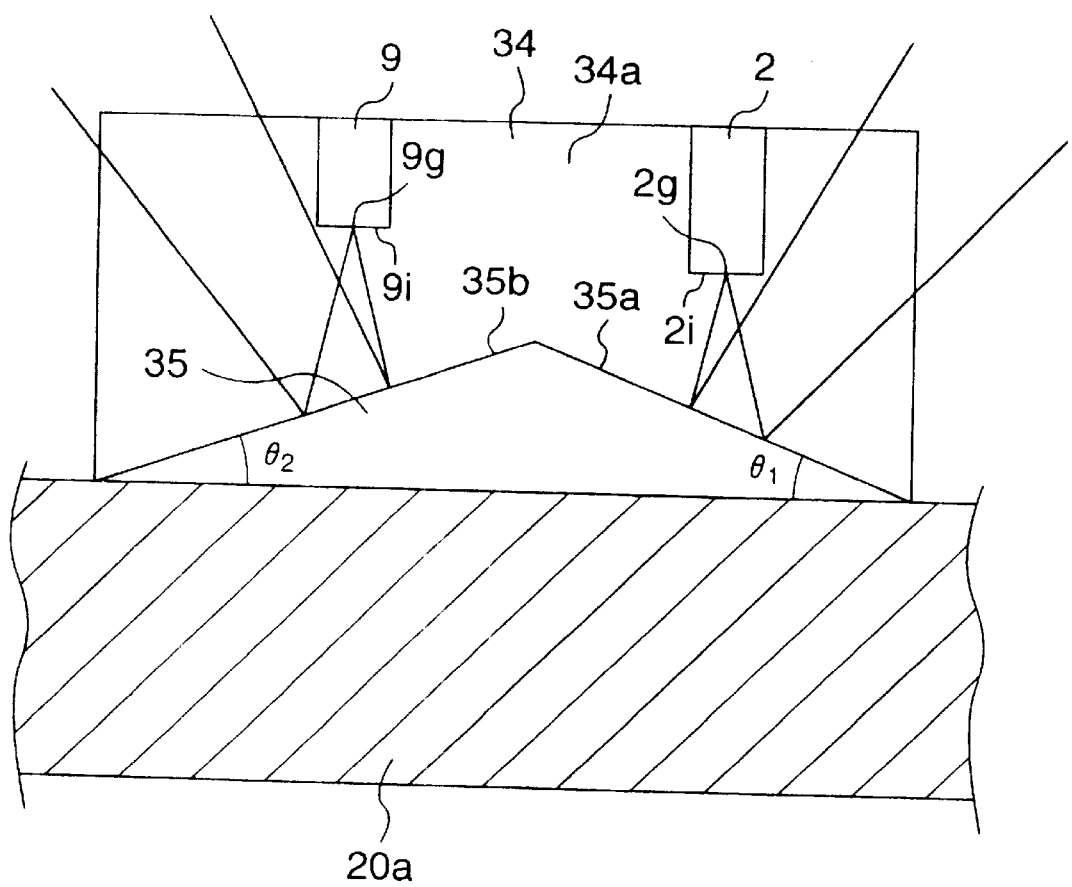
FIG. 10 is an enlarged view of a neighborhood of the light sources of the second embodiment according to the present invention.

Referring to FIG. 10, there is shown an enlarged view of a neighborhood of the light sources of the second embodiment according to the present invention.

A reflection member 35 is mounted on the substrate 20a of the package 20; a plane 35a opposite to the end surface 2i on which the luminous point 2g of the light source 2 is present is arranged being inclined toward the side of the light source 2, and a plane 35b opposite to an end surface 9i on which the luminous point 9g of the light source 9 is present is arranged being inclined toward the side of the light source 9.

As a material of the reflection member 35, it is preferable to use a metallic material having a high reflectance or to form the reflection member 35 with a low-cost material having a low reflectance before forming a metallic or dielectric film having a high reflectance over the planes 35a and 35b or only on a portion on which light is incident.

The angles of inclination of the planes 35a and 35b of the reflection member 35 are preferably set according to the diffusion angles of the light emitted from the light source 2 and the light source 9. In other words, for example, if a degree of the diffusion angle of the light emitted from the light source 2 is greater than that of the diffusion angle of the light emitted from the light source 9, an angle of inclination $\theta_1$ of the plane 35a which is greater than an angle of inclination $\theta_2$ of the plane 35b makes it possible to prevent not only light from the light source 9 having a low diffusion angle but also light from the light source 2 having a high diffusion from being included into a predetermined optical path of the optical member 22 or the light receiving elements, whereby an occurrence of stray light can be significantly limited, so as to achieve an optical pickup having favorable signal characteristics.

Both of the angle of inclination of the plane 35a and the angle of inclination of the plane 35b set to $\theta_2$ makes is possible to limit the number of the settings of the inclined planes to a single time to form the both planes in a manufacturing process of the reflection member 35 while restraining an occurrence of stray light significantly, and therefore it is possible to improve the productivity and to reduce the cost due to the simplified manufacturing process.

Furthermore, the angles of inclination are preferably set, taking into consideration also distances between the light source 2 and the reflective surface 35a and between the light source 9 and the reflective surface 35b.

Although the planes 35a and 35b of the reflection member 35 are inclined in an x y direction in FIG. 10 in this embodiment, they may be inclined in a yz direction toward the opposite direction of the light source mounting portion 34.

With this configuration, the inclined planes can be arranged on a single surface of the reflection member 35, so as to increase the productivity of the reflection member 35.

Although the planes 35a and 35b of the reflection member 35 are formed so as to have high reflectance, a high extinction modulus may be applied instead of the high reflectance in the same manner as for the first embodiment.

Further, it is the most preferable to have a configuration in which the light reflected by the planes 35a and 35b is discharged to the outside of the package 20 from an opening other than the opening 20d on the sidewall portion 20b of the package 20. This configuration makes it possible to discharge the backward emitting light from the light sources 2 and 9 to the outside of the package 20 almost completely, so as to significantly decrease the possibility of an occurrence of stray light caused by the backward emitting light. In this embodiment, the opening is preferably covered by a transparent member such as glass or resin, since it is effective to prevent a degradation caused by the light sources or the light receiving elements in contact with an air or moisture.

Although the backward emitting light from the light source 2 or 9 is reflected or absorbed by the reflection member 35 in this embodiment, there may be used a configuration in which, instead of the reflection member 35, cutouts are arranged so as to have predetermined angles of inclination to the end surfaces 2i and 9i of the light sources 2 and 9 in portions opposite to the light sources 2 and 9 of the substrate portion 20a so that the light from the light sources 2 and 9 is reflected or absorbed by a reflective or light absorbent surface placed in the cutout portions. With this configuration, the reflective or light absorbent surface can be arranged in the substrate portion 20a, and therefore the reflection member 35 can be omitted so as to decrease the number of the components and to simplify assembling processes of the optical pickup.

Further, with the light absorbent surface arranged on the surface of the substrate portion 20a which is opposite to the light sources without cutouts on the substrate portion 20a, backward emitting light from the light sources 2 and 9 can be absorbed, whereby stray light can be restrained. In this configuration, both of the reflection member 35 and the cutouts of the substrate portion 20a need not be arranged, and therefore the manufacturing process of the substrate portion 20a can be simplified and the number of the components be decreased, which leads to increasing the productivity of the optical pickup and to lowering the cost easily.

As set forth hereinabove, with the configuration in which light from the plurality of the light sources contained in an identical package is caused to be incident on the optical member having the plurality of the optical elements so as to be guided to almost the same optical path, the optical elements or other components can be condensed to a single unit though they are conventionally arranged for each light source, and therefore the entire optical pickup can be significantly downsized in comparison with the optical pickup whose respective light sources are arranged separately and the positioning between respective optical members and respective light sources is unnecessary, whereby the productivity is greatly increased and further installation errors between the respective optical elements can be decreased to the minimum, and therefore favorable optical characteristics can be achieved and a loss of light caused by installation errors between respective optical elements can be minimized, by which an optical pickup having a favorable efficiency of utilizing light can be obtained. Furthermore, it does not need to form a plurality of optical systems corresponding to a plurality of the light sources, respectively, by using an optical member, whereby it is possible to increase the productivity due to a decrease of the number of the components and to simplify the positioning of the components.

With the configuration in which light from two light sources is guided to an identical path in the optical member 22 bonded to the package 20, it requires less members for a unification into a single optical path in comparison with a configuration in which they are unified outside the optical head, and therefore the number of the components can be decreased and the processes required for positioning between the light sources and these members be omitted, so as to achieve an optical pickup having a favorable productivity. Furthermore, due to a single optical axis of the light emitted from the optical member 20, it is possible to suppress a decrease of the quantity of light on the light emitting surface of the optical member 20 and to reduce portions in the light emitting surface which requires surface grinding to prevent an occurrence of an aberration in comparison with the configuration in which there are a plurality of axes of emitted light, whereby the grinding processes can be simplified and a manufacturing time be reduced according to it.

Furthermore, with at least one of the light emitted from the light source 2 and the light emitted from the light source 9 being reflected by the optical member 22 a plurality of times so as to be guided to a predetermined optical path, the optical member 22 can be downsized and a length of the optical path from the optical member 22 can be decreased in comparison with a configuration in which the light is guided without reflection, and therefore it is possible to actualize a smaller and thinner optical pickup. As described in this embodiment, in the configuration in which the light from the light source 2 is emitted almost in parallel with the light from the light source 9, an optimization of an arrangement position in the optical member 20 and the number of reflection times makes the most ideal relationship between a distance from the light source 2 to the light emitting surface of the optical member 20 and a distance from the light source 9 to the light emitting surface, and therefore the optical characteristics in this optical pickup can be favorable without so much difference between the height of the light source 2 and that of the light source 9 from the substrate portion 20a. Accordingly, the size of the package can be reduced and therefore it can contribute to downsizing of an optical pickup.

Still further, with different diameters of the light emitted from the optical member 20 between luminous flux from the light source 2 and luminous flux from the light source 9, a diameter of the light incident on the condenser 17 can be changed and therefore a convergence position of the light from the light source 2 can be different from that of the light from the light source 9. In other words, with a diameter of the light which is incident on the condenser being differentiated between individual light sources, it becomes possible to condense light to the record mediums having different record area positions by using a single condenser so that the information can be recorded or reproduced. In addition, the same effects can be obtained by using different diffusion angles of the light incident on the condenser, and a further remarkable difference can be obtained in the convergence position with a combination of different apertures for incident light and diffusion angles.

An explanation will now be made for an operation of an optical pickup having the configuration described above.

If the record medium is the high-density optical disk 18, light is emitted from the light source 2 for recording or reproduction. In this condition, the light emitted from the light source 2 is reduced in its diffusion angle by the diffusion angle converting means 23, in other words, an extent of the light is reduced.

This diffusion angle converting means 23 is effective to transmit more of the light emitted from the light source 2 toward the high-density optical disk 18, and therefore it becomes possible to obtain efficiently a quantity of panel light on the high-density optical disk 18 which is particularly required by a large amount for recording data. Accordingly, it is effective to provide an optical pickup which can be favorably used for both of recording and reproduction.

In addition, this configuration makes it possible to decrease the light which may be included into portions other than a predetermined optical path of the optical member 22, which reduces components of stray light in the optical member 22, and therefore it is also possible to prevent stray light from being incident on the light receiving means 21 or the like to degrade signal components.

The light whose extent is reduced by the diffusion angle converting means 23 is transmitted through the filter 24 almost completely, also transmitted through the polarizing separation film 25 which is arranged behind it almost completely, and then incident on the color (chromatic) aberration correcting (compensating) means 501. The color (chromatic) aberration correcting (compensating) means 501 is set so as not to apply a color (chromatic) aberration correction effect to the light emitted from the light source 2 almost at all, and therefore the incident light is transmitted through the color (chromatic) aberration correcting (compensating) means 501 without any application of the effect of the color (chromatic) aberration correcting (compensating) means 501 almost at all, and then it is incident on the quarter-wavelength plate 26.

When passing through the quarter-wavelength plate 26, the light which has been a linear polarization until then is converted to a circular polarization, and then if there is a collimater lens, it passes through the collimater lens 16 and is converted to parallel light before it is incident on the condenser 17, and otherwise, it is directly incident on the condenser 17, and then the light is converged to the high-density optical disk 18.

Returning light which has been reflected by the high-density optical disk 18 is incident on the quarter-wavelength plate 26 again, and then it is converted from the circular polarization to the linear polarization which crosses at right angles to the polarization direction in which the light is emitted from the light source 2 when passing through the plate 26 and incident on the polarizing separation film 25. At this point, since the polarization direction is different from that of the forward path, the light is reflected by the polarizing separation film 25 and incident on the diffusion angle converting means 31 via the reflection means 29 and 30. The light incident on the diffusion angle converting means 31 is reflected without being diffracted almost at all, luminous flux having a predetermined shape is formed in a given position on the light receiving means 21 by the signal formation means 32, and an RF signal and both of focusing and tracking signals are generated based on the light incident on the light receiving means 21, so as to reproduce information and to perform an optimum control of the optical pickup.

If the record medium is the low-density optical disk 19, light is emitted from the light source 9 for recording or reproduction. In this condition, in relation to the light emitted from the light source 9, the direction of an extent of the light is changed from the diffusion direction to the convergence direction, in other words, the light is converted from diffused to converged light by the diffusion angle converting means 27.

The light converted to the converged light by the diffusion angle converting means 27 is divided to a plurality of beams by the means for forming a plurality of beams 28 to be reflected and incident on the filter 24. Then, the light is reflected by the filter 24 almost completely, is transmitted through the polarizing separation film 25 behind it almost completely, and then is incident on the quarter-wavelength plate 26.

When passing through the quarter-wavelength plate 26, the light which has been a linear polarization until then is converted to a circular polarization, and then if there is a collimater lens, it passes through the collimater lens 16 so as to have a smaller diffusion angle before it is incident on the condenser 17, and otherwise, it is directly incident on the condenser 17, and then the light is converged to the low-density optical disk 19. At this point, the diameter of the light incident on the condenser 17 becomes smaller than that of the light from the light source 2.

Then, returning light which has been reflected by the high-density optical disk 19 is incident on the quarter-wavelength plate 26 again, and then it is converted from the circular polarization to the linear polarization which crosses at right angles to the polarization direction in which the light is emitted from the light source 9 when passing through the plate 26 and incident on the polarizing separation film 25. At this point, since the polarization direction is different from that of the forward path, the light is reflected by the polarizing separation film 25 and incident on the diffusion angle converting means 31 via the reflection means 29 and 30. The light incident on the diffusion angle converting means 31 is reflected with being diffracted to plus one-dimensional light almost completely, and the light which has been diffusion light before being incident is converted to converged light to be incident on the signal formation means 32.

Luminous flux having a predetermined shape is formed in a given position on the light receiving means 21 by the signal formation means 32, and an RF signal and both of focusing and tracking signals are generated based on the light incident on the light receiving means 21, so as to reproduce information and to perform an optimum control of the optical pickup.

If a plurality of light sources are arranged in different positions in the same package as described above, the light emitted from respective light sources often generates a wavefront aberration significantly different each other. To cope with it, an optimization is made for distances between the luminous point 2a of the light source 2 and the collimater lens and between the luminous point 9a of the light source 9 and the collimater lens. It will now be explained below.

Figure 11:
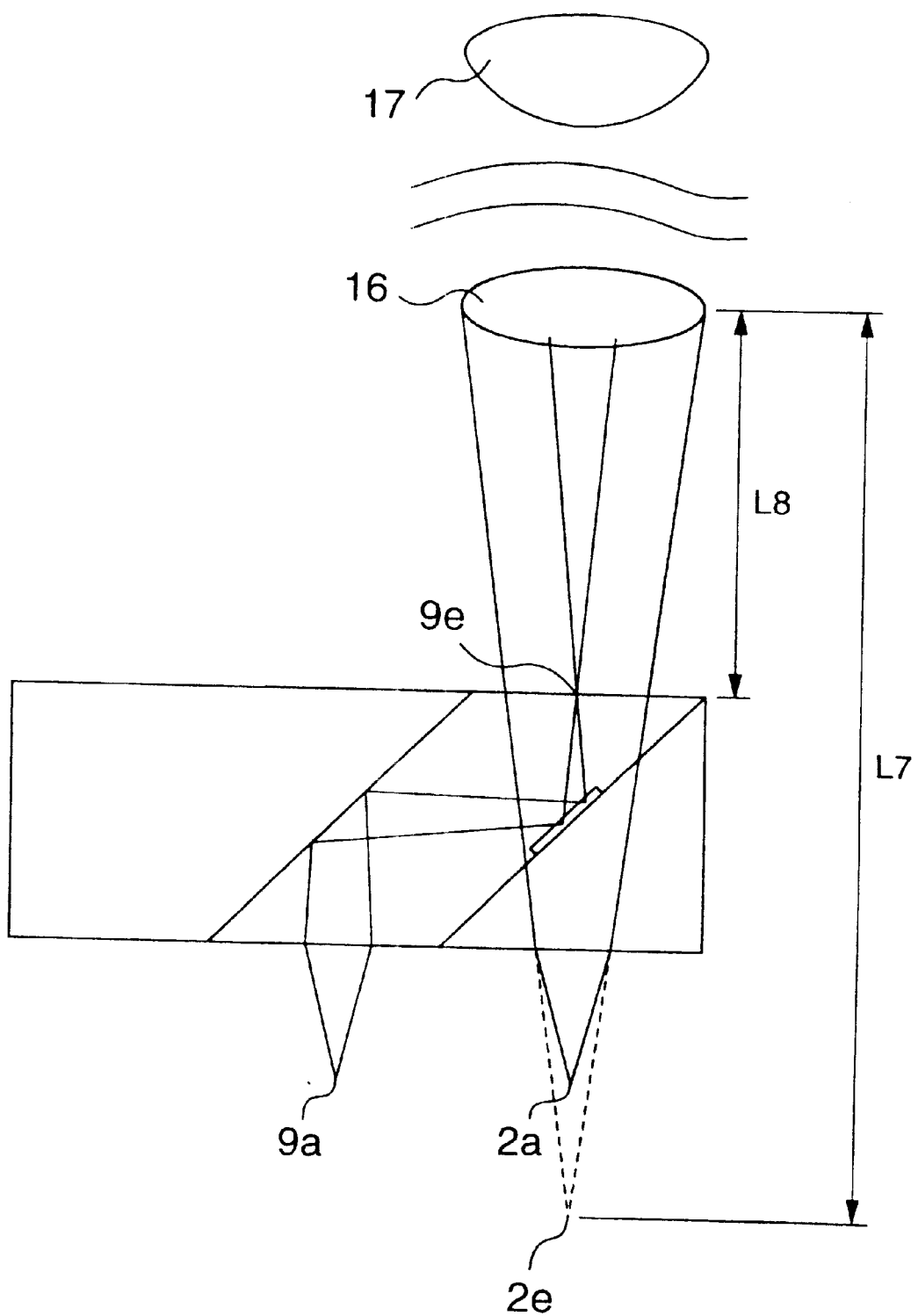
FIG. 11 is a diagram illustrating a relationship between a luminous point in an infinite optical system and a collimating lens of the second embodiment according to the present invention.
Figure 12:
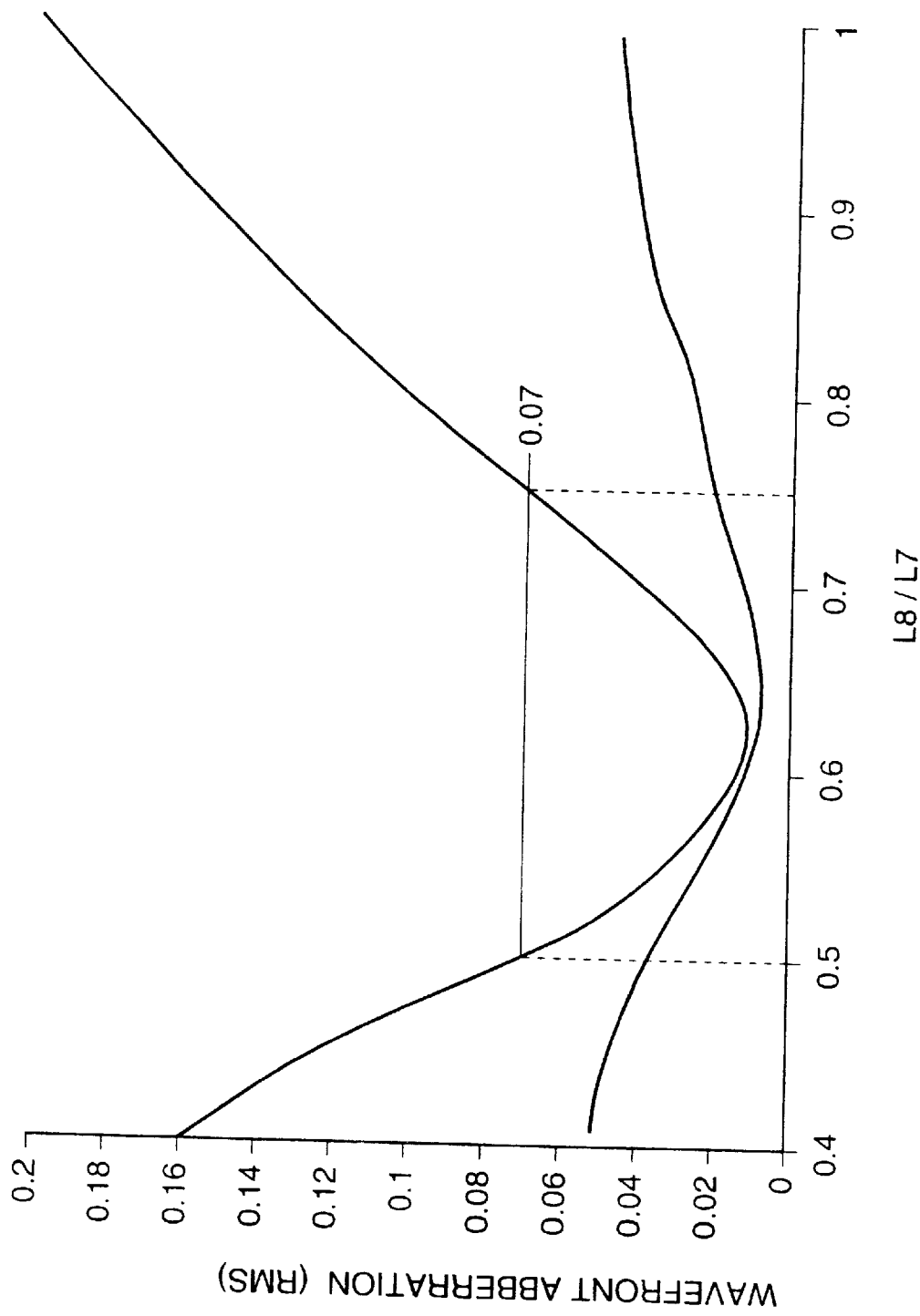
FIG. 12 is a diagram illustrating a relationship between a wavefront aberration amount in light and a distance ratio depending on a presence or absence of a shift of a condenser of the second embodiment according to the present invention.

Referring to FIG. 11, there is shown a diagram of a relationship between a luminous point in an infinite optical system and a collimater lens of the second embodiment according to the present invention. In FIG. 11, reference numeral L7 indicates an effective focal length between the collimater lens 16 and a virtual luminous point 2e, and reference numeral L8 indicates an effective focal length between the collimater lens 16 and a virtual luminous point 9e. Additionally, referring to FIG. 12, there is shown a relationship between a wavefront aberration amount in light and a distance ratio depending on a presence or absence of a shift of the condenser of the second embodiment according to the present invention. In other words, when a ratio of L7 to L8 is changed, a wavefront aberration amount which is generated at an incidence on the condenser is compared between a case in which the condenser 17 shifts by 500 $\mu$m in a tracking direction (indicated by a thick line) and a case in which it does not shift in the tracking direction (indicated by a thin line). In general, a condenser under reproduction on an optical disk has a possibility of shifting by a maximum of 500 $\mu$m in a tracking direction. In addition, taking into consideration that it is assumed that approx. 0.07 $\lambda$ (where $\lambda$ indicates a wavelength of light) or lower of a wavefront aberration amount as an RMS value is allowed to converge light which has been incident on the condenser into the optical disk effectively, and assuming that the wavefront aberration amount is 0.07 $\lambda$ or lower at the maximum shift amount (500 $\mu$m) of the condenser 17 for the light from the luminous point 9a in which the aberration amount is relatively large and the incidence conditions to the condenser 17 are severe, light from both of the luminous points will converge on the optical disk independent of the shift amount of the condenser 17 after it is incident on the condenser 17. To satisfy this condition, apparently as shown in FIG. 12, the ratio of L7 to L8 (L8÷L7=H, it is described as hereinafter, H) is preferably within a range of 0.50<H<0.75.

Further, if the wavefront aberration amount is 0.04 $\lambda$ or lower as an RMS value under the same conditions, the light incident on the condenser 17 is converged very precisely on the optical disk independently of a shift amount of the condenser 17 whether the incident light is emitted from either luminous point 2a or 9a. To satisfy this condition, apparently as shown in FIG. 12, the ratio of L7 to L8 (H) is preferably within a range of 0.53<H<0.70 since it is effective to improve signal characteristics.

With an arrangement of the optical system so that the value of H is within the above range, the wavefront aberrations in every luminous flex can be theoretical threshold or lower values in an optical pickup having a plurality of types of luminous flux in a single optical system, and therefore every luminous flux can be condensed on the optical disk by using a single condenser 17.

Accordingly, only one condenser 17 is needed for condensing, so that the number of condensers can be decreased and it is not required to arrange any switching means for condensers, whereby it becomes possible to downsize an optical pickup, to increase the productivity due to a decrease of the number of the components, and further to improve the reliability of the optical pickup and to increase the operation speed due to omission of a complicated mechanism.

Although an infinite optical system having the collimater lens 16 is used in this embodiment, a finite optical system may be used, too. If it is used, a space is not needed for arranging the collimater lens in comparison with the configuration in which the infinite optical system is used, and therefore a size of the entire optical pickup can be reduced.

[Third Embodiment]

Figure 13:
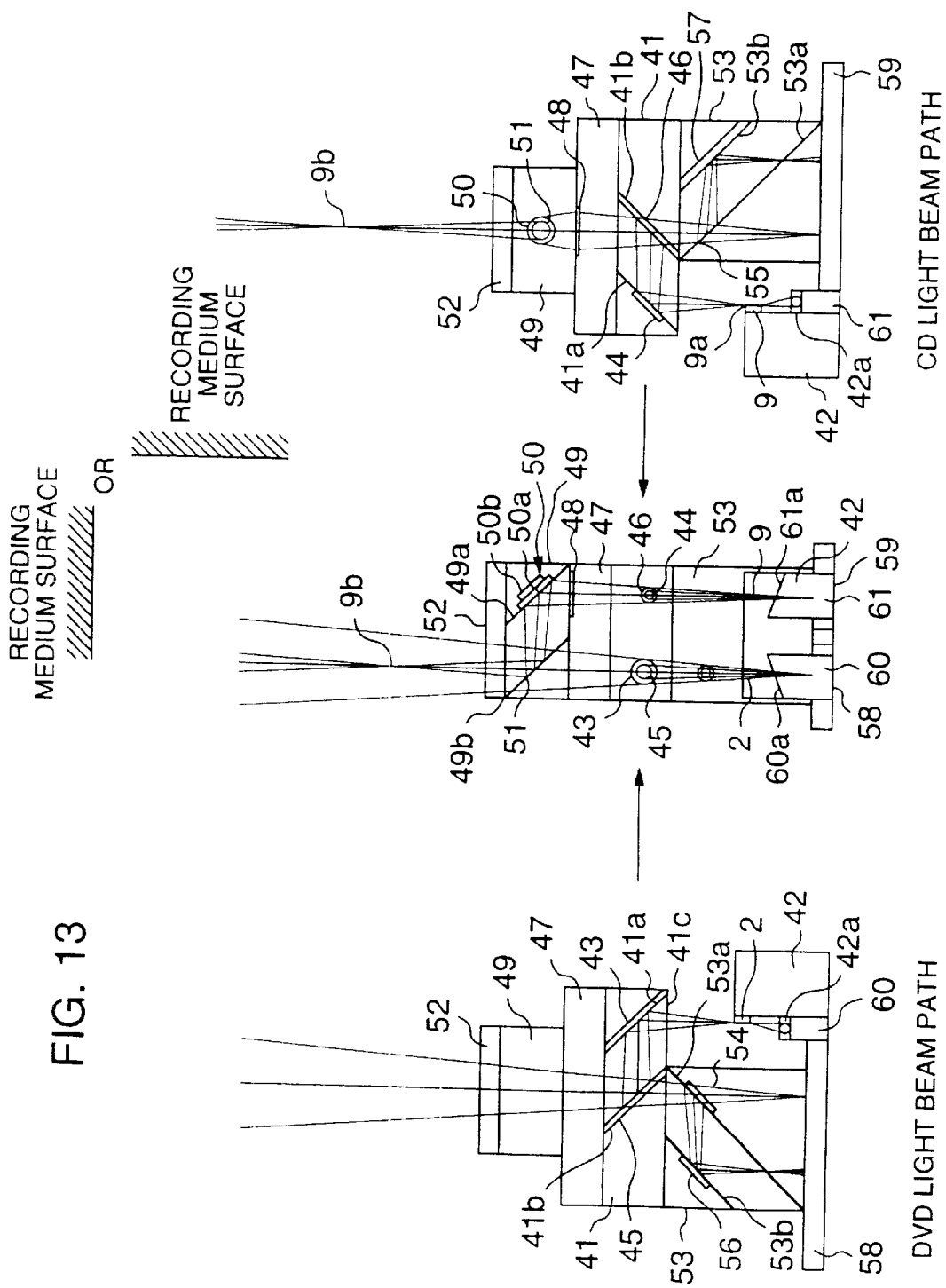
FIG. 13 is a schematic cross sectional view showing an integrated optical head of a third embodiment of the present invention, with an attitude relationship between directions of the light beams emitted from the light beam source and each of the usable recording surfaces.
Figure 14:
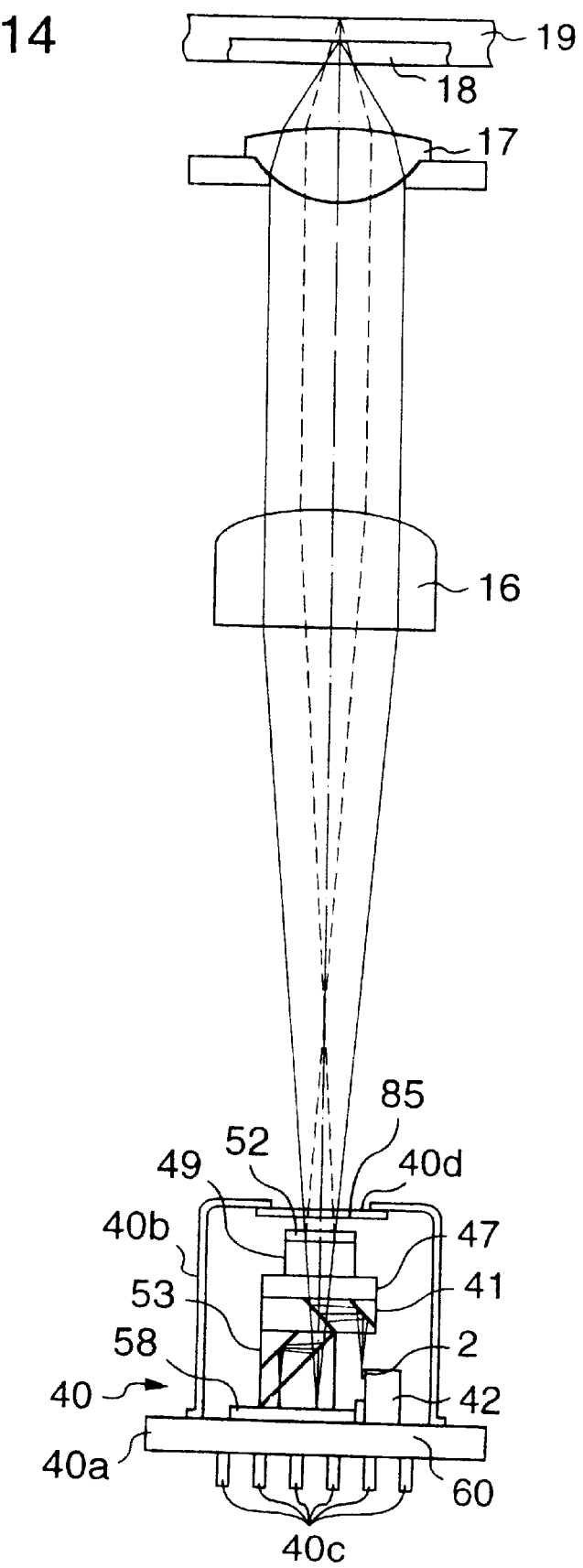
FIG. 14 is a schematic cross sectional view showing the proceedings of different light beams in the third embodiment.

A third embodiment of the present invention will be described below with reference to the accompanying drawings. FIG. 13 is a cross-sectional view of an integrated optical head according to the third embodiment of the present invention, and FIG. 14 is a cross-sectional view of an optical system according to the third embodiment of the present invention. In the cross-sectional view in FIG. 14, a linear optical path is shown. In FIGS. 13 and 14, the same reference numerals as are used for the first embodiment are employed to denote corresponding or identical components.

In FIGS. 13 and 14, a package comprises a light source 2, for emitting light for a high-density optical disk 18; a light source 9, for emitting light for a low-density optical disk 19; a substrate portion 40a, on which are mounted light receiving means 58 for receiving light reflected by the high-density optical disk 18, and light receiving means 59 for receiving light reflected by the low-density optical disk 19; and a sidewall portion 40b arranged to enclose these members. The substrate portion 40a, the sidewall portion 40b, terminals 40c and an opening 40d, which form the package 40, have substantially the same structure as the substrate portion 20a, the sidewall portion 20b, the terminals 20c and the opening 20d of the package 20, except for the size.

In this embodiment, the opening 40d is sealed by a sealing member 85.

Since an optical source mounting portion 42 on which the light sources 2 and 9 are mounted also has substantially the same structure as the optical source mounting portion 34 in the second embodiment, no explanation for it will be given.

In the third embodiment, reflection members 60 and 61 are provided in the direction in which backward emitting lights 2h and 9h of the light sources 2 and 9 extend.

The reason that the reflection members 60 and 61 are separately provided will now be given.

The oscillation wavelengths of the light sources 2 and 9 differ from each other in order to cope with different recording mediums. In this embodiment, the light source 2, which has an oscillation wavelength of 630 to 660 nm, and the light source 9, which has an oscillation wavelength of 770 to 800 nm, are employed.

In general, for a metal or a dielectric material that is used to reflect light, a ratio of light (reflectance) that is reflected relative to incident light varies in consonance with the wavelength of the incident light, i.e., dependency of reflectance on wavelength frequently exists. Therefore, when the lights from the light sources 2 and 9 are to be reflected by a reflection member having the same structure, the reflection ratio relative to the light from the light source 2 differs from that relative to the light from the light source 9, and an inconvenient phenomenon, such as an increase in the scattering of light, will occur.

In this embodiment, therefore, the reflection members 60 and 61 are provided separately and are formed of different materials. That is, the reflection member 60 is formed of a material that has a great reflectance relative to the wavelength of the light emitted by the light source 2, and the reflection member 61 is formed of a material that has a great reflectance relative to the wavelength of the light emitted by the light source 9.

With this structure, the backward emitting lights from the light sources 2 and 9 can be reflected in predetermined directions, so that they can be prevented from scattering at surfaces 60a and 61a and entering optical members and the light receiving means as stray light.

The same effect can also be obtained by forming the reflection members 60 and 61 of the same material and by depositing a reflection film of a different material or a different thickness on the surfaces 60a and 60b.

A first optical member 41 guides lights emitted by the light sources 2 and 9 to predetermined optical paths, and guides light that is reflected by the optical disk and returned to a predetermined path. The first optical member 41 has a first inclined surface 41a and a second inclined surface 41b, and desirably, a surface on which light impinges and a surface from which light is emitted are almost parallel to each other. Since with this arrangement the occurrence of astigmatism relative to incident light can be limited, the deterioration of the optical characteristics of transmitted light can be prevented. Various optical devices are formed on the first and the second inclined surfaces 41a and 41b.

The optical devices of the first optical member 41 will now be explained.

First, reflection films 43 and 44 are deposited on the first inclined surface 41a. The reflection film 43 reflects light, emitted by the light source 2, in a predetermined direction, and the reflection film 44 reflects light, emitted by the light source 9, in a predetermined direction. It is preferable that the reflection films 43 and 44 be formed by alternately laminating layers of metal, such as Ag, Au or Cu, having a high reflectance, or layers of a plurality of dielectric materials having different refractive indexes.

Although the reflection films 43 and 44 are separately formed in this embodiment, a single large reflection film may be deposited on all of the first inclined surface 41a. In this case, since a process for forming a reflection film using a mask can be eliminated and a mask for forming the reflection film is not required, productivity can be enhanced and manufacturing costs can be reduced.

Polarizing separation films 45 and 46 are deposited on the second inclined surface 41b. The light that is emitted by the light source 9 and reflected by the reflection film 44 enters the polarizing separation film 46, and the light that is emitted by the light source 2 and reflected by the reflection film 43 enters the polarizing separation film 45. The polarizing separation film 45 and 46 transmit light having a specific direction of polarization, and reflect light having other directions of polarization. It is preferable that the polarizing separation films 45 and 46 be provided by alternately laminating layers of a plurality of dielectric materials having different refractive indexes, so that a more accurate PS separation can be performed. Particularly in this embodiment, the polarizing separation films 45 and 46 are so formed that the S polarization elements emitted by the light sources 2 and 9 can be transmitted and the P polarization elements can be reflected.

Since, with the polarizing separation films 45 and 46, almost the entire quantity of light to be transmitted can be guided to a recording medium, the efficiency of the use of light can be improved and a predetermined light quantity on the disk can be obtained with a small output by the light sources 2 and 9. This is very desirable for extending the service life of the light sources 2 and 9.

Although the polarizing separation films 45 and 46 are separately provided in this embodiment, a large reflection film may be deposited on almost all of the second inclined surface 41b. In this case, since a process for forming a reflection film using a mask can be eliminated and a mask for forming the reflection film is not required, productivity can be enhanced and manufacturing costs can be reduced.

In addition, although in this embodiment the polarizing separation films are employed as means for separating emitted light from returning light, separation means, such as half-mirrors, may be employed to provide the necessary quantity of light at the disk.

A second optical member 47 will now be described. The second optical member 47 is bonded to the upper face of the first optical member 41 with a bonding agent, such as adhesive glass, ultraviolet hardening resin, or epoxy resin. The faces of the second optical member 47, which are positioned opposite each other, are flat, light transmitting plates that are parallel to each other, and a diffusion angle change (light beam diameter changing rate along beam axis adjusting) means 48 is provided at one end face through which the light from the light source 9 is transmitted.

The diffusion angle change means 48 is located at the end face opposite the light source 9 of the second optical member 47 and is aligned with the axis of the light that is emitted by the light source 9. The diffusion angle change means 48 changes the diffusion angle of the light entering from the light source 9 to a negative angle, i.e., alters an optical path so that the light that is emitted from a luminous point 9a of the light source 9 appears to be emitted from a nearer location. That is, the diffusion angle change means 48 substantially shifts a luminous point toward a recording medium. Therefore, the true luminous point 9a of the light source 9 is moved to an apparent luminous point 9e, so that the apparent length of the optical path from the light source 9 to the recording medium is reduced. It is preferable that the diffusion angle change means 48 be formed of a diffraction grating, particularly, a hologram, because then light can be transmitted efficiently. In particular, it is desirable that in its cross section the hologram have a four or more step shape or a saw-tooth shape because such a shape enables light to be used especially efficiently and a reduction in the light quantity is thereby decreased.

A third optical member 49 will now be described.

The third optical member 49 is bonded to the upper face of the second optical member 47 with a bonding agent, such as adhesive glass, ultraviolet hardening resin or epoxy resin.

The third optical member 49 guides, to substantially the same optical path, the lights that were emitted by the light sources 2 and 9 and guided via the first and the second optical members 41 and 47, and guides, to separate optical paths, the light that was reflected by the optical disk and returned.

In addition, the third optical member 49 has a first inclined surface 49a and a second inclined surface 49b, and it is preferable that a surface on which light impinges and a surface from which light is emitted be substantially perpendicular to the light axis and parallel to each other. Since, with this structure, the occurrence of astigmatism relative to incident light can be restricted, the deterioration of the optical characteristic of transmitted light can be prevented.

The first inclined surface 49a and the second inclined surface 49b are substantially parallel to each other, and are inclined substantially perpendicular to the plane that is formed by the axes of the lights that are transmitted via the first and the second optical members 41 and 47.

Various optical devices are formed on the first inclined surface 49a and the second inclined surface 49b.

Multiple beam forming means 50 is mounted on the first inclined surface 49a. The multiple beam forming means 50 has a polarized light separation film 50a for reflecting or transmitting light in consonance with a direction of polarization, and a beam splitter 50b for separating incident light into a plurality of luminous fluxes. The light, which is emitted by the light source 9 and passes through the diffusion angle change means 48, is substantially transmitted through the polarized light separation film 50a and enters the beam splitter 50b. The incident is separated or reflected into a plurality of luminous fluxes by the beam splitter 50b.

It is preferable that the beam splitter 50b be formed of a diffraction grating in order to form a plurality of fluxes efficiently. In this embodiment, the luminous fluxes of three lights, a zero-order light and positive and negative first-order lights that occur in the diffraction grating, are mainly formed.

Further, the beam splitter 50b also serves as a diaphragm relative to the light from the light source 9. In this embodiment, lights from both light sources 2 and 9 enter a single condensing lens 17, and an entrance pupil from the condensing lens 17 is so adjusted that the light from the light source 2 focused on the recording medium of the high-density optical disk 18. In this case, an appropriate shape and material are employed for the condensing lens 17 to focus the light for the light source 2 on the recording medium of the high-density optical disk 18.

To use the condensing lens 17 to focus the light from the light source 9 on the recording medium of the low-density optical disk 19, in this embodiment the diameter of the light source 9 that enters the condensing lens 17 is set so that it is smaller than the diameter of the light from the light source 2. In general, the circumferential portion of a lens has a stronger condensing function than does the center portion. When light having a larger diameter enters the lens, the focal point is brought nearer, and when light having a smaller diameter enters the lens, the focal point is moved farther away. Since in this embodiment the recording portion of the low-density optical disk 19 is located farther from the recording portion of the high-density optical disk 18, the incidence aperture for the light from the light source 9 incident to the condensing lens 17 is optimized, so that the light from the light source 9 can be focused on the recording portion of the low-density optical disk 19 by the condensing lens 17, which is designed in consonance with the light emitted by the light source 2.

The beam splitter 50b controls the incidence aperture of light. That is, the size of the beam splitter 50b is so adjusted that the light reflected by the beam splitter 50b has a predetermined diameter at the condensing lens 17.

As the beam splitter 50b has such a diaphragm function and the diameter of light emitted by the light source 9 can be precisely controlled, a light having a predetermined diameter can be obtained and projected onto the condensing lens 17, and the condensing lens 17 can be used to focus the light from the light source 9 onto the recording portion of the low-density optical disk. Compared with when a diaphragm is provided separately, the number of required components can be reduced and the labor required for the positioning of a diaphragm and the light source 9 can be eliminated, and the productivity of an optical pickup can be enhanced.

In addition, because the diaphragm is disposed at the above described position, the light that is emitted by the light source 9 and is not reflected by the beam splitter 50b is passed through the first inclined surface 49a and is output from the third optical member 49. As a result, the occurrence of an event where the light that was not reflected is changed to stray light in the package 40 can be prevented.

In addition, while a forward light that is directed to the low-density optical disk 19 is transmitted through the polarized light separation film 50a and enters the beam splitter 50b, a returning light that was reflected by the low-density optical disk 19 is reflected by the polarized separation film 50a, and almost no light enters the beam splitter 50b. Since a diaphragm function is provided for the beam splitter 50b of the thus structured multiple beam forming means 50a, even when, for example, the condensing lens 17 is shifted and the axis of the returning light is shifted from a predetermined position, almost no light enters the beam splitter 50b, which serves as the diaphragm. As a result, it is possible to prevent the quantity of light entering the receiving means from being reduced, which occurs when the light that is to enter the receiving means at the diaphragm is shielded, and to prevent the occurrence of an unbalanced distribution of a light quantity. Therefore, a more accurate RF signal can be obtained and a servo signal, such as a focusing signal or a tracking signal, can be generated more precisely.

Furthermore, since a diaphragm can be located at a position along the optical path for both a forward light and a returning light, the efficiency in the use of the space in the optical pickup can be improved. That is, since a separate optical path for a returning light is not required to prevent transmission of the returning light through the diaphragm, the size of the optical pickup can be reduced more.

In addition, the beam splitter 50*b* in this embodiment is arranged along the optical path along which the light from the light source 9 passes, so that light from the light source 9 enters the beam splitter 50*b*, while light emitted by the light source 2 to the high-density optical disk 18 does not enter it. As a result, the diaphragm for the light from the light source 9 does not shield the light emitted by the light source 2 nor does it adversely affect it. Therefore, an optical pickup wherein a plurality of light sources are retained in one package and one condensing lens is employed to focus lights from the light sources on predetermined positions is particularly preferable because lights from multiple light sources and having predetermined diameters can enter the condensing lens without being affected by each other.

A plurality of luminous fluxes thus formed are projected onto predetermined positions on the track of the low-density optical disk 19, and the quantities of the returning lights are compared with each other to perform tracking for the low-density optical disk 19. This tracking method is generally called a three-beam method.

If the three-beam method is not employed as the tracking method, instead of the beam splitter 50*b* a film having merely a diagram function is provided to serve as diaphragm means, rather than the multiple-beam forming means.

A filter 51 having wavelength selectivity is provided for the second inclined surface 49*b*. The filter 51 transmits almost 80% of the light that is guided from the light source 2, and reflects almost 80% of light that is guided from the light source 9.

Since by forming the filter 51 on the second inclined surface 49*b*, light from only the light source 9 can be reflected without substantially disturbing the light emitted by the light source 2, a high ratio of the lights emitted by the light sources 2 and 9 can be guided to a recording medium. Since recording on or reproduction from the recording medium is possible without increasing the quantities of the lights that are emitted by the light sources 2 and 9, a reduction in the service lives of the light sources 2 and 9, which is caused by operating them in a high-output condition, can be prevented. In addition, since the light sources 2 and 9 operated in a low-output condition can be employed, the temperature of the light sources 2 and 9 does not rise substantially and the shifting of the oscillation wavelengths of the light sources 2 and 9, which accompanies temperature changes, seldom occurs. Therefore, a high performance optical pickup that can ensure a more precise focal point can be provided.

The lights from the light sources 2 and 9 are guided along substantially the same light axis by the third optical member 49.

The optical path, along which the light from the light source 9 enters the third optical member 49 and is so reflected by the multiple-beam forming means 50 that the reflected light enters the filter 51, is formed so that it extends almost perpendicular to the plane that includes the light projected forward in the first optical member 41.

A ¼ wavelength plate 52 changes the directions of the polarization of the light that is emitted by the light source 2 and transmitted through the filter 51, and of the light that is emitted by the light source 9 and reflected by the filter 51 from directions for linear polarization to those for elliptical polarization.

The ¼ wavelength plate 52 may be provided as a plate having a predetermined thickness, as in the third embodiment, or as a thin film.

A fourth optical member 53 will now be described.

The fourth optical member 53 is bonded to the bottom surface of the first optical member 41 by using adhesive glass, an optical hardening resin or an epoxy resin, and guides, to a predetermined position, a returning light that is reflected by a recording medium. The fourth optical member 53 has a first inclined surface 53*a* and a second inclined surface 53*b*, and an optical device adequate for the purpose is formed on individual inclined surfaces.

In this embodiment, optical path dividing means 54 and 55 are formed on the first inclined surface 53*a*. The optical path dividing means 54 transmits or reflects the light that is emitted by the light source 2, is reflected by the high-density optical disk 18 and is returned; and the optical path dividing means 55 transmits or reflects the light that is emitted by the light source 9, is reflected by the low-density optical disk 19 and is returned. It is preferable that a half-mirror be employed, so that, for both optical path dividing means 54 and 55, the quantity of light to be transmitted is substantially equal to the quantity of light to be reflected.

Reflection films 56 and 57 are formed on the inclined surface 53*b*. The reflection film 56 guides, to a predetermined position, the light that is reflected by the optical path dividing means 54 and is transmitted thereto; and the reflection film 57 guides, to a predetermined position, the light that is reflected by the optical path dividing means 55 and is transmitted thereto. It is desirable that the reflection films 56 and 57 be formed of highly reflective metal, such as Ag, Au or Cu, or a plurality of dielectric materials having different refractive indexes.

Light receiving means 58 receives light that is transmitted through the optical path dividing means 54, and light that is reflected by the optical path dividing means 54 and by the reflection film 56. Light receiving means 59 receives light that is transmitted through the optical path dividing means 55, and light that is reflected by the optical path dividing means 55 and by the reflection film 57. For both light receiving means 58 and 59, various receiving portions in required number and having required shapes are disposed at positions required for producing an RF signal, a tracking signal and a focusing signal.

Furthermore, it is preferable that the optical sources 2 and 9, the light receiving means 58 and 59 and the optical members 41, 47, 49 and 53 be disposed in a closed space, as in the first and the second embodiments.

In the third embodiment, the first, the second, the third and the fourth optical members 41, 47, 49 and 53 constitute a light guiding member that guides light emitted by a light source to a predetermined position and provides a predetermined optical characteristic for the light, and guides a light reflected by a recording medium to a predetermined position and provides a predetermined optical characteristic for the light.

Since multiple optical members are arranged to provide such an optical guiding member, the number of optical devices formed on one inclined surface of each optical member can be reduced to the minimum, so that the productivity of the optical members can be improved.

When many optical devices of a variety of different types are formed on a single inclined surface, a problem arises in that when an optical device is formed, another optical device that was formed previously is adversely affected, so that a desired performance can not be obtained and the rate at which failures occur is increased. However, when the optical guiding member is made of a plurality of optical members, as in this embodiment, only one or two optical devices at most are required to be formed on almost all the inclined surfaces, and the above problem seldom occurs. As a result, a reliable optical pickup having a satisfactory yield can be provided.

As is described above, since lights from a plurality of light sources having different oscillation wavelengths are emitted to a plurality of optical members, on which optical devices are formed, and are guided to a predetermined optical path, the multiple optical devices that are conventionally provided for each light source can be assembled into a single set. Thus, compared with an optical pickup in which the optical devices are distributed, the size of the optical pickup in this embodiment can be drastically reduced.

In addition, since the alignment of the positions of the optical devices relative to the light sources is not required, the productivity of the optical pickups is improved. Further, since errors in the mounting of the optical devices can be reduced to the minimum, a preferable optical characteristic can be acquired.

Furthermore, since the light receiving devices and the optical members, which are constituted by a plurality of members having predetermined functions, are arranged in one package, the conventional assembling process for an optical pickup, which is performed while the positions of the light sources, the optical devices, the light receiving devices and other lenses are adjusted, can be simplified and reduced into a process for which is required only the adjustment of the lenses and the package, for which the positions of the light sources, the light receiving devices and the optical members have already been adjusted. Thus, the assembly of an optical pickup is greatly facilitated, and productivity can be increased and manufacturing costs can be considerably reduced.

Since the loss of light due to an error in the mounting the optical devices can be reduced to the minimum, an optical pickup that uses light efficiently can be implemented.

Further, since the lights emitted by the two light sources 2 and 9 are led to the same optical path in the optical member 49 provided in the package 40, as compared with the case where optical paths are formed into a single one outside the optical head, a member for forming a single optical path is not required, and the number of required components can be reduced and a procedure employed for aligning the positions of the light sources and that member is not required. As a result, the thus structured optical pickup provides a satisfactory productivity. And in addition, since there is only a single axis for the light that is output by the optical member 49, compared with when there are a plurality of axes for output lights, a portion of a light output surface can be reduced for which surface grinding is required to prevent a reduction in the light quantity and the occurrence of an aberration on the light output surface of the optical member 49. In this instance, the grinding process can be simplified, and accordingly, the time required for manufacturing can be reduced.

Furthermore, since at least one of the lights that are emitted by the light sources 2 and 9 is reflected multiple times by the optical members 41, 47 and 49, and the reflected light is guided to a predetermined optical path, the sizes of the optical members 41, 47 and 49 can be reduced, and the length of the optical path after the light is output by the optical member 22 can be shorter than that it is when the light is guided without being reflected. As a result, the size and the thickness of the optical pickup can be reduced. When a reflection count by the optical members differs for the light from the light source 2 and the light from the light source 9, the optical characteristic required for each light can be provided by the optimal reflection count. This is very effective for reducing the size of the optical members. As will be described later, if the distance from the light source 2 to a collimator lens 16 differs from the distance from the light source 9 to the collimator lens 16, the reflection count is changed to adjust the locations of the light sources, thereby greatly contributing to a reduction in the size of the package 40.

As is shown in the third embodiment, in the arrangement where the lights from the light sources 2 and 9 are emitted almost in parallel, the locations of the reflection members in the optical members 41, 47 and 49 and the reflection counts are optimized, so that the most ideal relationship can be obtained for the distances from the light source 2 to the output surfaces of optical members 41, 47 and 49, and the distances from the light source 9 to the output surfaces. Therefore, a desirable optical characteristic of the optical pickup can be acquired without greatly changing the heights of the light sources 2 and 9 relative to the base portion 40a. As a result, the size of the package 40 can be reduced, thereby contributing to the reduction in the size of the optical pickup.

In this embodiment, the lights from the light sources 2 and 9 are guided to almost the same optical path by the optical member 49, which is the farthest from these light sources 2 and 9. Since, with this structure, the lights from the light sources 2 and 9 pass along separate optical paths immediately before they are output by the package 40, the locations for the optical devices that act on the individual lights can be easily acquired in the optical members, and the number of optical devices located outside the package 40 can be reduced to the minimum. In this manner, the count for the alignments of the positions of these components in the optical system can be reduced to the minimum, and accordingly, a user-friendly optical pickup having an easy assembly process can be provided. In addition, since the efficient use of space in the optical members can be increased to the maximum, this can contribute greatly to the reduction in the size and the thickness of the optical pickup.

Since the optical devices can be formed in consonance with the properties of the lights that are emitted by the light sources, it is possible to provide an optical pickup having a satisfactory optical characteristic that can perform precisely a predetermined operation both for light from the light source 2 and light from the light source 9.

Further, as in this embodiment, since the lights emitted by the light sources 2 and 9 impinge on the same face of the same optical member, it is not necessary for an incidence face for light from the light source 2 and an incidence face for light from the light source 9 to be separately provided in the optical members 41, 47 and 49, and the number of incidence faces that must be formed can be reduced. Thus, productivity can be enhanced and a member, such as a reflection member, that can be used in common need only be formed across the entire incidence face to cope with light both from the light source 2 and the light source 9. Compared with when the members that are used in common are separately formed on different incidence faces, the number of manufacturing procedures can be drastically reduced and the productivity for the optical pickup can be enhanced.

The diameter of the light that is output by the package 40 differs between a luminous flux from the light source 2 and a luminous flux from the light source 9, and the diameter of the light impinging on the condensing lens 16 can be changed, so that the location at which the light from the light source 2 is converged can differ from that for the light from the light source 3. That is, since the diameter of the light that impinges on the condensing lens differs in consonance with the light sources, by using a single condensing lens, light can be condensed for a recording medium having a different recording face position, and information can be recorded thereon or reproduced therefrom. The same effect can be obtained by changing a diffusion (light beam diameter changing) angle of the light that enters the condensing lens. A greater difference between convergent positions can be obtained by changing the diameter of the light using a combination of an incident aperture and a diffusion (light beam diameter changing) angle.

In this embodiment, the lights emitted by the light sources 2 and 9 impinge on the same optical member; however, the lights may impinge on independent optical members in the same package. With this structure, since an optical member for the light emitted by the light source 2 differs from an optical member for the light emitted by the light source 9, only an optical device that provides a predetermined optical characteristic for each light need only be formed in each optical member. Therefore, the forming of different types of optical devices is not required on the same inclined surface, and a cause of the deterioration of the performances of the optical devices can be removed. In addition, the probability can be reduced that, for example, the light from the light source 2 will impinge on the optical device for the light from the light source 9, and will return to the optical path for light from the light source 2 and become stray light. Therefore, an excellent optical pickup is provided for which there is little deterioration of the optical characteristic.

Furthermore, in this embodiment, the light sources 2 and 9 are located facing the surface 41c of the first optical member 41. The lights that are emitted by the light sources 2 and 9 impinge on the surface 41c of the first optical member 41, and are changed to luminous fluxes having a predetermined property by the optical devices, which are arranged in the first, the second and the third optical members 41, 47 and 49, and these luminous fluxes are guided to the recording medium.

With this structure, the positions of the light sources 2 and 9 can be aligned by employing, as a reference surface, the surface 41c of the first optical member 41 facing the light sources. That is, since the multiple light sources can be positioned by using the surface 41c as a reference, more accurate positioning can be performed relative to the optical devices formed in the optical members, thereby preventing deterioration of the optical characteristic, which occurs due to the shifting of the light sources relative to the optical devices of the optical members. Since there is only one surface employed as a reference, mutual adjustment of the positions of the light sources 2 and 9 can be facilitated.

When, like the optical member 41, no optical device is formed at a portion where lights from the light sources impinge, very delicate machining must be performed for the surface 41c, which serves as an incidence face, to reduce the surface roughness as much as possible so that incident light does not scatter.

In this embodiment, since lights from multiple light sources are emitted onto the same surface of the optical member, the number of faces for which such a delicate machining is required can be reduced. As a result, the manufacturing process during which delicate machining is performed can be simplified and the productivity of optical heads can be improved. In addition, since the manufacturing costs related to the delicate machining can also be reduced, an inexpensive optical head can be provided.

Therefore, there is almost no position shifting between the light sources and no position shifting between the light sources and the optical devices, and a reliable optical pickup that has a desirable optical characteristic can be achieved.

In this embodiment, the distance between the light source 2 and the surface 41c of the first optical member 41, which faces the light sources, is equal to the distance between the light source 9 and the surface 41c. Since the light sources 2 and 9 are disposed with this positional relationship, they can be fixed so that they abut on, for example, the same parallel-plate member, and accuracy for the heights of the light sources 2 and 9 can be easily obtained. This prevents the deterioration of the optical characteristic, which is caused by inaccurate height positioning, so that an optical pickup that has a desirable recording or reproduction characteristic can be obtained.

In addition, the light sources 2 and 9 are arranged in a light-source mounting portion 42, as well as the light-source mounting portion 34 in the second embodiment.

Although the surface of the light-source mounting portion must be very accurately chamfered, in the structure where a plurality of light sources are arranged on the same surface, chamfering is not required. Thus the number of manufacturing procedures can be reduced, and accordingly, productivity can be improved and manufacturing costs can be reduced.

The operation of the thus structured optical pickup will now be described.

When a recording medium is the high-density optical disk 18, the light source 2 emits light to perform recording or reproduction. First, the light emitted by the light source 2 is reflected by the reflection film 43 formed on the first inclined surface 41a of the fist optical member 41, and impinges on the polarized light separation film 45 formed on the second inclined surface 41b. Since the polarized light separation film 45 reflects linearly polarized light that is emitted by the light source 2, and transmits light that is polarized perpendicular to that light, the light emitted by the light source 2 is reflected.

The light output from the first optical member 41 is transmitted through the second optical member 47 and enters the third optical member 49. The light is transmitted through the filter 51 formed on the second inclined surface 49b of the third optical member 49, is output from the third optical member 49, and enters the ¼ wavelength plate 52. The light that has impinged on the ¼ wavelength plate 52 is changed from linearly polarized light to elliptically polarized light, which is then output by the ¼ wavelength plate 52.

Following this, the light emitted by the light source 2 is transmitted through the collimator lens 16, if there is one provided, and is changed to almost parallel light, which enters the condensing lens 17. If there is no collimator lens 16, the light from the light source 2 enters the condensing lens 17 directly. The light then converges at the high-density optical disk 18.

Then, the light is reflected by the high-density optical disk 18 and is returned to the ¼ wavelength plate 52. When the light is reflected by the high-density optical disk 18, the rotation direction for elliptical polarization is opposite to that when the light enters the high-density optical disk 18. Therefore, when the light is transmitted through the ¼ wavelength plate 52, the elliptically polarized light is changed to linearly polarized light, which is substantially perpendicular to the polarized light that was emitted by the light source 2. In other words, the S polarized light emitted by the light source 2 is changed to P polarized light which enters the third optical member 49.

Almost all the light that is input to the third optical member 49 is transmitted through the filter 51 on the second inclined surface 49b, is output from the third optical member 49, is transmitted through the second optical member 47, and enters the first optical member 41.

The light then impinges on the polarized light separation film 45 deposited on the second inclined surface 41b of the first optical member 41. Since the polarization direction of the incident light is perpendicular to what it was when the light was first emitted, almost all the light is transmitted through the polarized light separation film 45, is output from the first optical member 41, and is input to the fourth optical member 53.

The light that is input to the fourth optical member 53 enters the optical path dividing means 54 formed on the first inclined surface 53a of the fourth optical member 53. By means of the optical path dividing means 54, almost half of the incident light is transmitted and the remaining half of the light is reflected.

The light transmitted through the optical path dividing means 54 is received by the light receiving portion, which is arranged at a predetermined position on the light receiving means 58 that is located below the fourth optical member 53. A light flux having a predetermined shape is formed on the light receiving portion to generate a signal that is consistent with the purpose.

When a recording medium is the low-density optical disk 19, the light source 9 emits light to perform recording or reproduction. First, the light emitted by the light source 9 is reflected by the reflection film 44 formed on the first inclined surface 41a of the first optical member 41, and impinges on the polarized light separation film 46 formed on the second inclined surface 41b. Since the polarized light separation film 46 reflects linearly polarized light emitted by the light source 9, and transmits light that is polarized perpendicular to that light, the light emitted by the light source 9 is reflected.

The light output by the first optical member 41 enters the diffusion angle change means 48 that is formed on the end surface of the second optical member 47. The diffusion angle change means 48 changes the diffusion angle of the light emitted by the light source 9, and the diffused light is output as converged light from the second optical member 47 and enters the third optical member 49.

The light input to the third optical member 49 impinges on the multiple-beam forming means 50 formed on the inclined surface 49a, and is transmitted through the polarized light separation film 50a. When the light is transmitted through the beam splitter 50b, it is split into one main beam and two side beams, and these beams enter the filter 51 formed on the second inclined surface 49b. Since the filter 51 reflects the light from the light source 9, and transmits the light from the light source 2, almost all the light that is passed from the multiple-beam forming means 50 to the filter 51 is reflected and is output by the third optical member 49.

Following this, the light from the light source 9 enters the ¼ wavelength plate 52. The light is changed from linearly polarized light to elliptically polarized light, which is output by the ¼ wavelength plate 52.

The light emitted by the light source 9 is transmitted through the collimator lens 16, if there is one provided, and is changed to almost parallel light, which enters the condensing lens 17. If there is no collimator lens 16, the light from the light source 9 enters the condensing lens 17 directly. The light then converges at the low-density optical disk 19.

The light is reflected by the low-density optical disk 19 and is returned to the ¼ wavelength plate 52. When the light has been reflected by the low-density optical disk 19, the rotation direction of the elliptically polarized light is opposite to what it was when it entered. Therefore, when the light is transmitted through the ¼ wavelength plate 52, the elliptically polarized light is changed to linearly polarized light, which is substantially perpendicular to the polarized light that was emitted by the light source 9. In other words, the S polarized light that is emitted by the light source 9 is changed to P polarized light, which enters the third optical member 49.

Almost all the light input to the third optical member 49 is reflected by the filter 51 formed on the second inclined surface 49b, and impinges on the multiple-beam forming means 50 on the first inclined surface 49a. Since the direction of the polarization of the incident light is substantially perpendicular to that of the forward light, almost all the incident light is reflected by the polarized light separation film 50a without entering the beam splitter 50b, and is output by from the third optical member 49 to the diffusion angle change means 48 in the second optical member 47.

The diffusion angle of the diffused light that entered the diffusion angle change means 48 is changed to obtain a luminous flux. The luminous flux is transmitted through the second optical member 47 and enters the first optical member 41.

Following this, the light impinges on the polarized light separation film 46 deposited on the second inclined surface 41b of the first optical member 41. Since the direction of the polarization of the incident light is almost perpendicular to that of the light when it was emitted, almost all the light is transmitted through the polarized light separation film 46, and is output by the first optical member 41 to the fourth optical member 53.

The light input to the fourth optical member 53 enters the optical path dividing means 55 formed on the first inclined surface 53a of the fourth optical member 53. By means of the optical path dividing means 55, almost half of the incident light is transmitted and the remaining half of the light is reflected.

The light transmitted through the optical path dividing means 55 is received by the light receiving portion, which is arranged at a predetermined position on the light receiving means 59 that is located below the fourth optical member 53. A light flux having a predetermined shape is formed on the light receiving portion to generate a signal that is consistent with the purpose.

The light reflected by the optical path dividing means 55 is reflected by the reflection film 57 deposited on the second inclined surface of the fourth optical member 53. A luminous flux having a predetermined shape is formed on the predetermined light receiving portion of the light receiving means 59 to generate a signal that is consistent with the purpose.

In the third embodiment as well as in the first embodiment, since a wavefront aberration that affects the lights emitted by the individual light sources tends to vary greatly, the distances between the light emitting points 2a and 9a of the light sources 2 and 9 and the collimator lens 16 are optimized. Since the idea is the same as in the second embodiment, no explanation for it will be given.

As previously described, in this embodiment, the light sources 2 and 9 are arranged on the side surface 42a of the light source mounting portion 42 at almost the same height from the bottom surface of the light source mounting portion 42. That is, the line that connects the light emitting point 2a of the light source and the light emitting point 9a of the light source 9 is substantially perpendicular to the surface of a recording medium.

With this arrangement, the first plane, which includes a light axis formed when the light emitted by the light source 2 passes through the first and the fourth optical members 41 and 53; the second plane, which includes a light axis formed when the light emitted by the light source 9 passes through the first and the fourth optical members 41 and 53; and the third plane, which includes a light axis formed when the light emitted by the light source 9 passes through the third optical member 49, can be employed as light transmission planes. In other words, instead of a surface that is either perpendicular or parallel to the surface of the recording medium, both a perpendicular surface and a parallel surface can be employed as a transmission plane.

When the first and the second planes are set almost parallel, it is possible to prevent the occurrence of a phenomenon whereby one part of the light originally related to the light axis that constitutes the first plane is input to the optical device, on which the light related to the light axis that constitutes the second plane should impinge, and becomes stray light; or the occurrence of a contrary phenomenon whereby one part of the light originally related to the light axis that constitutes the second plane is input to the optical device, on which the light related to the light axis that constitutes the first plane should impinge, and becomes stray light. As a result, a desirable optical characteristic can be obtained for the above arranged optical pickup, and a high performance optical pickup can be provided.

Since the above described three-dimensional transmission planes are formed, the efficiency in the use of space in the optical members can be improved; and the sizes of the individual optical members and the size of an optical pickup that incorporates these optical members can be reduced.

In addition, to use space three-dimensionally, if the frequency at which space extending toward a surface parallel to a recording medium is used is higher than a frequency at which space extending toward a surface that is not parallel to a recording medium is used, the thickness of each optical member can be reduced, and accordingly, a thinner optical pickup can be provided. As a result, it is possible to provide an optimal optical pickup, especially for an optical disk drive that is mounted in an information terminal, such as a portable computer.

In this embodiment, the light sources 2 and 9 are arranged perpendicular to the surface of the recording medium. Since the light sources are not arranged parallel to the surface of the recording medium, i.e., in the direction of the height perpendicular to the surface of the recording medium, the above described object can be achieved.

What is claimed is:

1. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein a diameter of the first light beam and a diameter of the second light beam are different from each other after being guided optically by the light beam guide.

2. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein the first light beam and the second light beam are different in wavelength from each other.

3. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources and the first and second light beam detectors are mounted in said container; and wherein said device further comprises an objective lens for focusing either of the first light beam and the second light beam on the optical recording medium, wherein a diameter of the first light beam when proceeding into the objective lens and a diameter of the second light beam when proceeding into the objective lens are different from each other.

4. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein the light beam guide includes a plane onto which the first and second light beams proceed from the first and second light sources.

5. An optical pickup device according to claim 4, wherein a distance between the first light beam and the plane along a path of the first light beam is substantially equal to a distance between the second light beam and the plane along a path of the second light beam.

6. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein the first and second light beams proceed in a first direction toward the light beam guide, at least one of the first light source and the second light source emits a supplemental light beam proceeding in a second direction, said optical pickup device has a portion other than the light beam guide receiving the supplemental light beam, and said optical pickup device further includes means for preventing the supplemental light beam from reflecting on said portion toward the light beam guide.

7. An optical pickup device according to claim 6, further comprising means for preventing the portion from extending perpendicular to at least one of the first and second directions.

8. An optical pickup device according to claim 6, wherein the portion includes a light beam absorbing material.

9. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein the first and second light sources have respective electrode-surfaces through which an electric power is supplied to the first and second light sources respectively, and the electrode-surfaces extends on an imaginal plane.

10. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein said device further comprises a light source base on which the first and second light sources are mounted.

11. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein a distance between the first light source and the optical recording medium is different from a distance between the second light source and the optical recording medium in a direction perpendicular to the optical recording medium.

12. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein at least one of the first and second light beams proceeds substantially straight until reaching the light beam guide.

13. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein at least one of the first and second light beams proceeds substantially parallel to the surface of the optical recording medium at least partially between being emitted and reaching the light beam guide.

14. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein at least one of the first and second light beams proceeds substantially perpendicular to the surface of the optical recording medium at least partially between being emitted and reaching the light beam guide.

15. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources and the first and second light beam detectors are mounted in said container; and wherein the first and second light beams proceed substantially parallel to each other at least partially between being emitted and reaching the light beam guide.

16. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein the first and second light beams proceed substantially parallel to the surface of the optical recording medium when being emitted.

17. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein the first and second light beams proceed substantially parallel to each other when being emitted.

18. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein a size of the first light source is different from that of the second light source.

19. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein a power of the first light beam is larger than that of the second light beam, and a size of the first light source is larger than that of the second light source.

20. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein the optical pickup device further comprises a light source base on which the first and second light sources are mounted, and a contact area between the first light source and the light source base is different from a contact area between the second light beam source and the light beam source base.

21. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein a power of the first light beam is larger than that of the second light beam, said optical pickup device further comprises a light beam source base on which the first and second light sources are mounted, and a contact area between the first light source and the light source base is larger than a contact area between the second light source and the light source base.

22. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein a power of the first light beam is larger than that of the second light beam, and a surface area of the first light source is larger than a surface area of the second light source.

23. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein said optical pickup device further comprises a first light source base on which the first light source is mounted, and a second light source base on which the second light source is mounted, and a thermal conductivity of the first light source base is different from that of the second light source base.

24. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, and a light beam guide for receiving either of the first and second light beams so that the light beam guide guides said either of the first and second light beams so that said either of the first and second light beams proceeds along a single light beam path extending toward the surface of the optical recording medium, wherein said optical pickup device further comprises a first light source base on which the first light source is mounted, a second light source base on which the second light source is mounted, and a carriage on which the first and second light source bases are mounted, and a contact area between the first light source base and the carriage is different from a contact area between the second light source base and the carriage.

25. An optical pickup device for recording information onto an optical recording medium and/or reading out the information from the optical recording medium, said device comprising:

a first light source emitting a first light beam toward a surface of the recording medium;

a second light source emitting a second light beam toward the surface of the recording medium; and a light beam guide arranged to receive either of the first and second light beams so that the light beam guide guides the either of the first and second light beams so that the either of the first and second light beams proceeds along a single light beam path extending toward the surface of the optical recording medium, the light beam guide including:

at least one optical member having a plurality of inclined surfaces; and optical elements arranged on the inclined surfaces to direct the first and second light beams toward the single light beam path.

26. An optical pickup device according to claim 25, wherein the inclined surfaces extend substantially parallel to each other.

27. An optical pickup device according to claim 25, wherein the inclined surfaces are prevented from extending substantially parallel to each other.

28. An optical pickup device according to claim 25, wherein an angle between each of the inclined surfaces and each of the first and second light beams is 30–60 degrees.

29. An optical pickup device for recording information onto an optical recording medium and/or reading out the information from the optical recording medium, said device comprising:

a first light source for emitting a first light beam toward a surface of the recording medium, a second light source for emitting a second light beam toward the surface of the recording medium, a light beam guide for receiving either of the first and second light beams so that the light beam guide guides said either of the first and second light beams so that said either of the first and second light beams proceeds along a single light beam path extending toward the surface of the optical recording medium, a light beam diameter limiter for receiving at least one of the first and second light beams, and a light beam detector for receiving the at least one of the first and second light beams after being reflected by the optical recording medium so that the information is read from the at least one of the first and second light beams after being reflected, wherein a part of the at least one of the first and second light beams is transmitted by the light beam diameter limiter to decrease a diameter of the at least one of the first and second light beams before being reflected by the optical recording medium, and the diameter of the at least one of the first and second light beams is prevented from being decreased by the light beam diameter limiter after being reflected by the optical recording medium.

30. An optical pickup device according to claim 25, wherein said light beam guide comprises a plurality of optical members having respective ones of said inclined surfaces and optical elements thereon.

31. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, the first and second light beam detectors, and the light beam guide member are mounted in said container.

32. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources, and the first and second light beam detectors are mounted in said container; and wherein the light beam guide member includes (i) a first optical member for guiding the first and second light beams from the first and second light sources to predetermined optical paths and for guiding said each of the first and second light beams reflected by the optical recording medium to a predetermined path, (ii) a second optical member provided with a diffusion angle change means for changing a diffusion angle of one of the first and second light beams from the first and second light sources to a negative angle, (iii) a third optical member for guiding the first and second light beams guided via the first and second optical members to a single light beam path and for guiding the first and second light beams reflected by the optical recording medium to separate optical paths, and (iv) a fourth optical member for performing at least one of transmitting and reflecting of the first and second light beams reflected by the optical recording medium.

33. An optical pickup device according to claim 32, wherein the second optical member is bonded to the first optical member, the third optical member is bonded to the second optical member, and the fourth optical member is bonded to the first optical member.

34. An optical pickup device according to claim 32, wherein the first, second, third and fourth optical members are mounted within a closed space defined by said container.

35. An optical pickup device according to claim 32, wherein said single light beam path along which either of the first and second light beams proceeds extends through said opening of the container.

36. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources and the first and second light beam detectors are mounted in said container; and wherein a single light beam path along which said light guide member directs either of said first and second light beams extends through said opening of the container.

37. An optical pickup device for recording information onto an optical recording medium and/or reading out the information from the optical recording medium, said device comprising:

first and second light sources for emitting respectively first and second light beams toward the optical recording medium;

a light beam guide member for (i) guiding each of said first and second light beams from said first and second light sources toward the optical recording medium, and (ii) guiding each of the first and second light beams reflected by the recording medium;

first and second light beam detectors for receiving respectively said first and second light beams reflected by the optical recording medium; and a container having an opening which is sealed by a seal member, wherein the first and second light sources and the first and second light beam detectors are mounted in said container; and wherein a length of a path along which the first light beam proceeds between the first light source in the container and said opening of said container is different from a length of a path along which the second light beam proceeds between the second light source in the container and said opening of said container.

38. An optical pickup device for recording information onto an optical recording medium and/or reading out the information from the optical recording medium, said device comprising:

a first light beam source for emitting a first light beam, a second light beam source for emitting a second light beam, a light beam detector for receiving each of the first and second light beams after reflection by the optical recording medium, and a light beam guide member for guiding the each of the first and second light beam, toward the optical recording medium and guiding said each of the first and second light beams after reflection by the optical recording medium toward the light beam detector, wherein (i) the light beam guide member includes a polarized light separation film and a reflection member, (ii) one of said first and second light beams after said reflection by the optical recording medium passes through the polarized light separation film and is reflected by the reflection member, and (iii) another of the first and second light beams after said reflection by the optical recording medium is reflected by the polarized light separation film to be prevented from being reflected by the reflection member.

39. An optical pickup device according to claim 38, wherein the polarized light separation film and the reflection member are adjacent to each other.

40. An optical pickup device according to claim 38, wherein said reflection member is a beam splitter.

* * * * *